US011928263B2

(12) United States Patent
Jung et al.

(10) Patent No.: US 11,928,263 B2
(45) Date of Patent: Mar. 12, 2024

(54) ELECTRONIC DEVICE FOR PROCESSING USER INPUT AND METHOD THEREOF

(71) Applicant: SAMSUNG ELECTRONICS CO., LTD., Suwon-si (KR)

(72) Inventors: Shinjae Jung, Suwon-si (KR); Insik Myung, Suwon-si (KR); Seungjoon Lee, Suwon-si (KR); Joayoung Lee, Suwon-si (KR); Inyoung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 17/457,976

(22) Filed: Dec. 7, 2021

(65) Prior Publication Data

US 2022/0179497 A1 Jun. 9, 2022

Related U.S. Application Data

(63) Continuation of application No. PCT/KR2021/017570, filed on Nov. 26, 2021.

(30) Foreign Application Priority Data

Dec. 7, 2020 (KR) .......................... 10-2020-0169457

(51) Int. Cl.
*G06F 3/048* (2013.01)
*G06F 3/01* (2006.01)
(Continued)

(52) U.S. Cl.
CPC ............ *G06F 3/017* (2013.01); *G06F 3/0482* (2013.01); *G06F 3/167* (2013.01); *G06F 40/166* (2020.01); *G06T 11/00* (2013.01); *G10L 15/26* (2013.01)

(58) Field of Classification Search
CPC ........ G06F 3/017; G06F 3/0482; G06F 3/167; G06F 40/166
See application file for complete search history.

(56) References Cited

U.S. PATENT DOCUMENTS

| 8,498,425 B2 | 7/2013 | Graylin |
| 9,448,620 B2 | 9/2016 | Kim |
| (Continued) | | |

FOREIGN PATENT DOCUMENTS

| JP | 2015-533001 A | 11/2015 |
| JP | 2017-058818 A | 3/2017 |
| (Continued) | | |

OTHER PUBLICATIONS

PCT International Search Report dated Mar. 18, 2022 for PCT/KR2021/017570.

*Primary Examiner* — Claudia Dragoescu
(74) *Attorney, Agent, or Firm* — Nixon & Vanderhye P.C.

(57) ABSTRACT

An electronic device include an at least partially transparent display, a camera, a memory, and a processor. The processor may be configured to receive a first gesture input using a part of a human body of a user using the camera, receive an utterance input of the user in response to the first gesture input, display text generated based on a property of the utterance input on coordinates corresponding to a position of a part of the human body of the user on augmented reality (AR) provided via the at least partially transparent display, end the reception of the utterance input, when receiving an end gesture input using a part of the human body of the user using the camera, and fix the displayed text in a specified position on the augmented reality (AR), in response to the received end gesture input.

20 Claims, 15 Drawing Sheets

(51) Int. Cl.
  *G06F 3/0482*    (2013.01)
  *G06F 3/16*      (2006.01)
  *G06F 40/166*    (2020.01)
  *G06T 11/00*     (2006.01)
  *G10L 15/26*     (2006.01)

(56) References Cited

U.S. PATENT DOCUMENTS

| | | | |
|---|---|---|---|
| 9,613,627 B2 | 4/2017 | Park et al. | |
| 9,788,105 B2 | 10/2017 | Graylin | |
| 10,444,851 B2 | 10/2019 | Yagi | |
| 10,534,438 B2 | 1/2020 | Klein et al. | |
| 10,592,002 B2 | 3/2020 | Iyer et al. | |
| 10,698,603 B2 | 6/2020 | Giusti et al. | |
| 10,768,693 B2 | 9/2020 | Powderly et al. | |
| 11,423,896 B2 | 8/2022 | Unter Ecker | |
| 2009/0199130 A1* | 8/2009 | Tsern | G04G 21/08 715/810 |
| 2013/0027296 A1 | 1/2013 | Klein et al. | |
| 2014/0006954 A1* | 1/2014 | Raffa | G06V 40/20 715/733 |
| 2014/0123049 A1 | 5/2014 | Buxton et al. | |
| 2015/0248168 A1* | 9/2015 | Sako | G06F 3/0488 715/863 |
| 2017/0344249 A1* | 11/2017 | Kim | G06F 3/04847 |
| 2018/0307303 A1* | 10/2018 | Powderly | G02B 27/0179 |

FOREIGN PATENT DOCUMENTS

| | | |
|---|---|---|
| JP | 7038602 B2 | 3/2022 |
| KR | 10-1947034 B1 | 4/2019 |
| KR | 2019-0141696 A | 12/2019 |
| KR | 102065045 B1 | 1/2020 |
| KR | 2020-0133832 A | 11/2020 |

* cited by examiner

ELECTRONIC DEVICE FOR PROCESSING USER INPUT AND METHOD THEREOF

CROSS-REFERENCE TO RELATED APPLICATIONS

This application is a continuation of International Application No. PCT/KR2021/017570 designating the United States, filed on Nov. 26, 2021, in the Korean Intellectual Property Receiving Office and claiming priority to Korean Patent Application No. 10-2020-0169457 filed Dec. 7, 2020, the disclosures of which are incorporated by reference herein in their entireties.

BACKGROUND

Field

Example embodiments disclosed in the disclosure relate to a method for processing a user input, such as, a gesture input, and an electronic device configured for the same.

Description of Related Art

An electronic device may provide various types of input interfaces. For example, the electronic device receives a touch scheme, that is, a touch input by contact or proximity to a touch object or may receive a voice input of a user, or the like. The electronic device may provide an input interface based on a gesture input. For example, the electronic device may detect an operation of a user for the electronic device or an operation of the electronic device and may perform a function corresponding to the detected result.

The electronic device may provide the input interface based on the above-mentioned gesture input, thus solving a problem of an input of a touch scheme, a speed recognition scheme, or the like. For example, the electronic device may perform a function of quickly and intuitively displaying an utterance input of the user as a text input via a gesture input in an environment such as augmented reality (AR) or virtual reality (VR).

SUMMARY

Various example embodiments disclosed in the disclosure are to provide a method and an apparatus for processing a gesture input in an electronic device.

Various example embodiments are to provide a method and an apparatus for quickly and intuitively generating and displaying text using a gesture input in an electronic device.

In accordance with an example aspect of the disclosure, an electronic device is provided in an example embodiment. The electronic device may include an at least partially transparent display, a camera, a memory, and at least one processor operatively connected with the at least partially transparent display, the camera, and the memory. The memory may store instructions that, when executed, are configured to cause the processor to receive a first gesture input via at least a part of a human body of a user via the camera, receive an utterance input of the user in response to the first gesture input, display text generated based on at least a property of the utterance input on/at coordinates corresponding to a position of a part of the human body of the user on augmented reality (AR) provided via the at least partially transparent display, end the reception of the utterance input, when receiving an end gesture input via at least a part of the human body of the user via the camera, and provide/fix the displayed text in a specified position on the augmented reality (AR), in response to at least the received end gesture input.

In accordance with an example embodiment, a method performed by an electronic device is provided. The method may include receiving a first gesture input using a part of a human body of a user using a camera included in the electronic device, receiving an utterance input of the user in response to the first gesture input, displaying text generated based on a property of the utterance input on coordinates corresponding to a position of a part of the human body of the user on augmented reality (AR) provided via an at least partially transparent display included in the electronic device, ending the reception of the utterance input, when receiving an end gesture input using a part of the human body of the user using the camera, and fixing the displayed text in a specified position on the AR, in response to the received end gesture input.

According to an example embodiment, a method and an apparatus may be provided such that the electronic device may quickly and intuitively generate a received utterance input as a text input using a gesture input.

According to an example embodiment, a method and an apparatus may be provided such that the electronic device may quickly and intuitively generate a received utterance input as text while maintaining a screen which is being currently displayed using a gesture input.

According to an example embodiment, a method and an apparatus may be provided such that the electronic device may quickly and intuitively edit a property of the generated text using a gesture input.

According to an example embodiment, a method and an apparatus may be provided such that the electronic device may quickly and intuitively map a function to the generated text using a gesture input.

In addition, various effects ascertained directly or indirectly through the disclosure may be provided.

BRIEF DESCRIPTION OF THE DRAWINGS

In relation to the description of the drawings, the same or similar reference numerals may be used with respect to the same or similar elements. Additionally, the above and other aspects, features and advantages of certain embodiments of the present disclosure will be more apparent from the following detailed description, taken in conjunction with the accompanying drawings, in which.

Any of the embodiment(s) described herein may be used in conjunction with any other embodiment(s) described herein.

DETAILED DESCRIPTION

Hereinafter, various example embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

Figure 1:
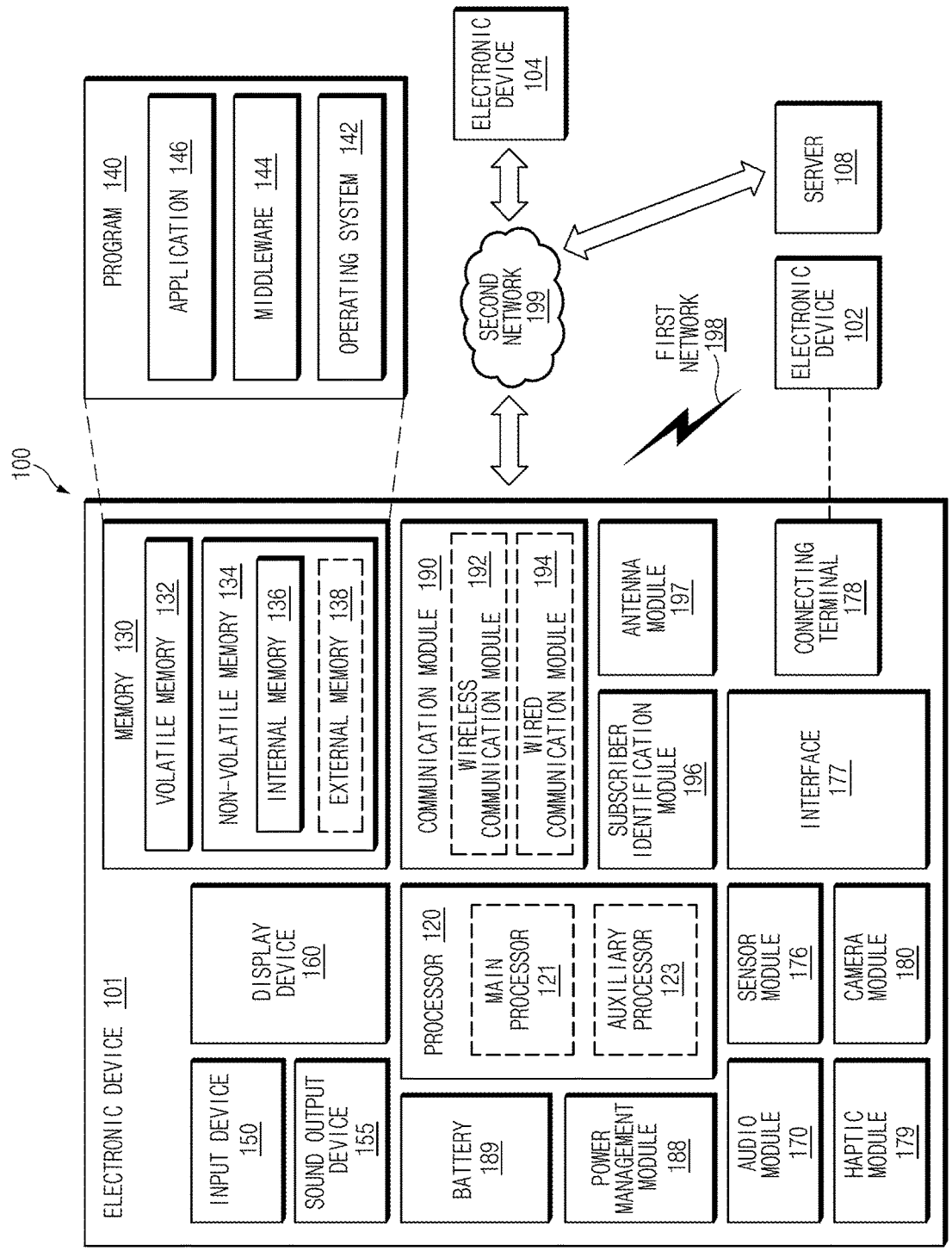
FIG. 1 is a block diagram of an electronic device in a network environment according to an embodiment of the disclosure.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150 comprising input circuitry, a sound output module 155 comprising circuitry, a display module 160 comprising a display, an audio module 170, a sensor module 176 comprising sensing circuitry, an interface 177 comprising interface circuitry, a connecting terminal 178, a haptic module 179, a camera module 180 comprising a camera, a power management module 188 comprising circuitry, a battery 189, a communication module 190 comprising communication circuitry, a subscriber identification module (SIM) 196, or an antenna module 197 comprising antenna(s). In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120, comprising processing circuitry, may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU) comprising processing circuitry, a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) comprising processing circuitry may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 comprising input circuitry may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176, comprising sensing circuitry, may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180, comprising a camera, may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
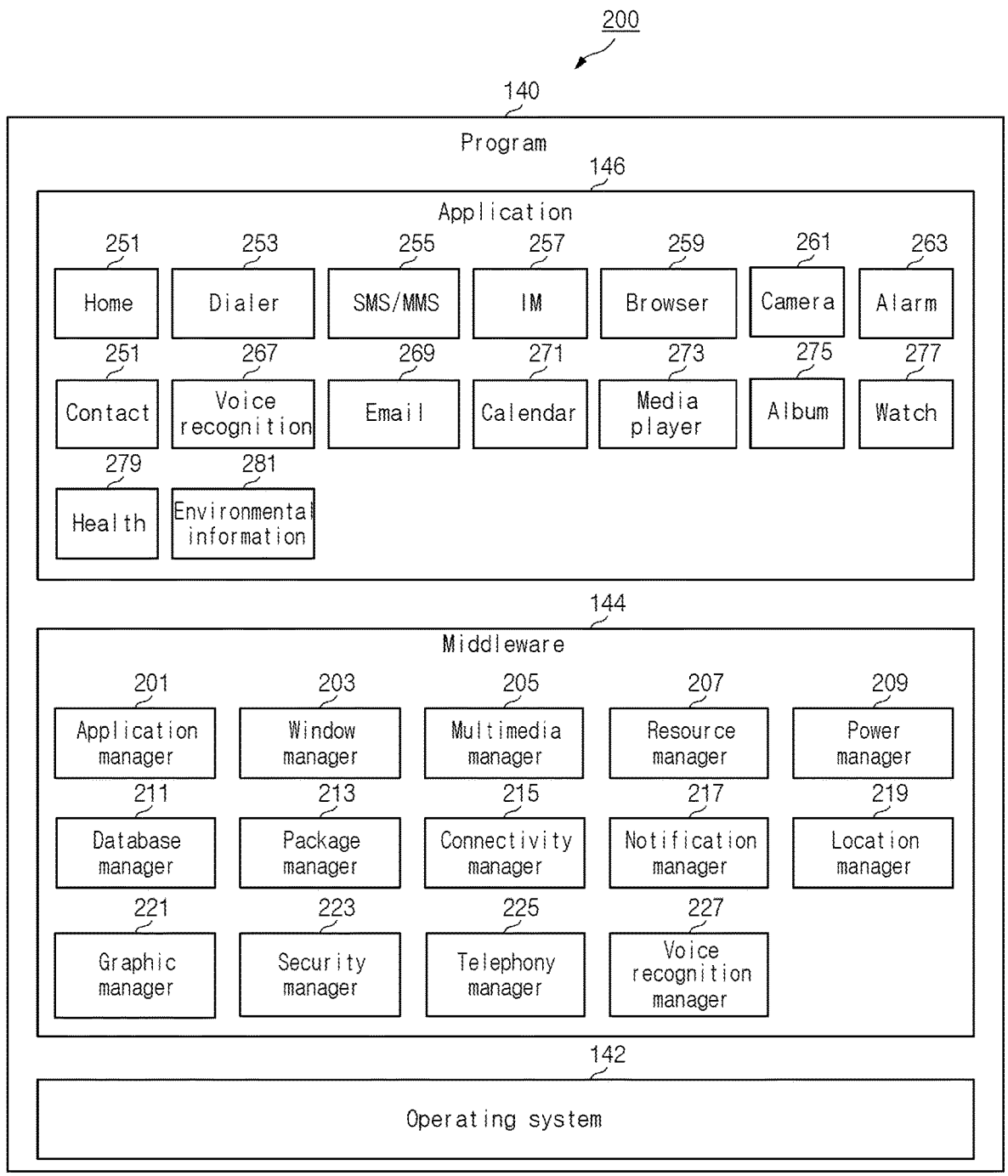
FIG. 2 is a block diagram illustrating the program according to various example embodiments.

FIG. 2 is a block diagram 200 illustrating the program 140 according to various example embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Any of the embodiment(s) described herein may be used in conjunction with any other embodiment(s) described herein.

Figure 3:
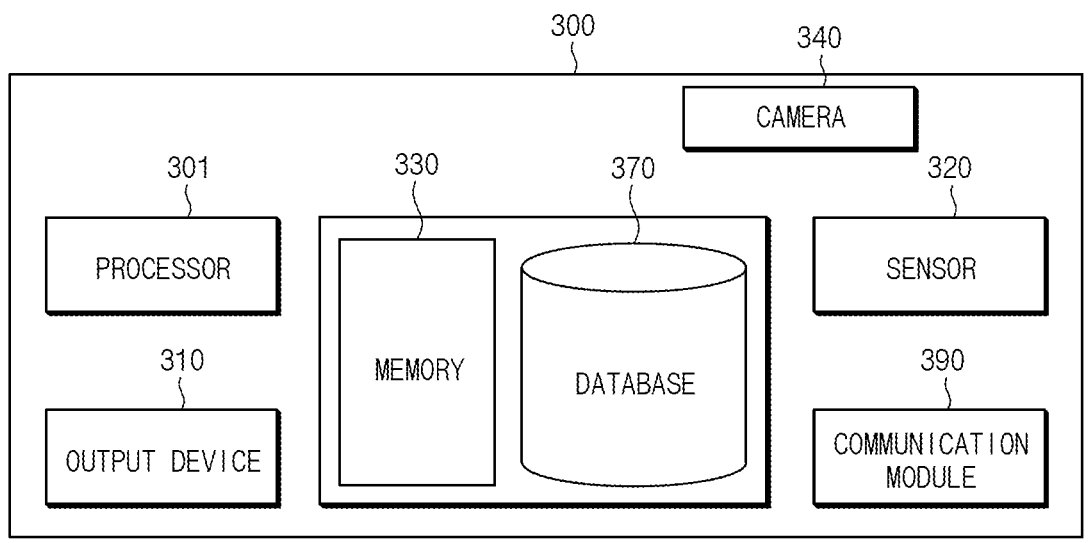
FIG. 3 is a block diagram illustrating a structure of an electronic device according to an embodiment.

FIG. 3 is a block diagram illustrating a structure of an electronic device 300 according to an example embodiment.

According to an embodiment, the electronic device 300 may include a processor 301 (e.g., a processor 1220 of FIG. 1), a memory 330 (e.g., a memory 130 of FIG. 1), a sensor 320 (e.g., a sensor modules 176 of FIG. 1) comprising sensing circuitry, a communication module 390 (e.g., a communication module 190 of FIG. 1) comprising communication circuitry, and an output device 310 (e.g., a display device 160 or a sound output device 155 of FIG. 1), a camera 340 (e.g., a camera module 180 of FIG. 1), and a database 370. Herein, FIG. 3 is to describe an example embodiment, and some components thereof may be omitted or changed.

The memory 330 may be an internal storage medium stored in the electronic device 300. For example, the internal storage medium may include a non-volatile memory. The memory may include an external storage medium (not shown) installed on the outside of the electronic device 300. For example, the external storage medium may include a non-volatile memory. The external storage medium is attachable or detachable. According to an embodiment, the external storage medium may fail to be mounted on the electronic device 300.

The memory 330 may store instructions causing the processor 301 (comprising processing circuitry) to process data or control the electronic device 300. An operation of the processor 301 or the electronic device 300 may be understood as being performed as the processor 301 executes instructions stored in the memory 330. The processor 301 may be implemented as a separate module or chip in the electronic device 300.

The communication module 390 (e.g., including wireless communication circuitry) may transmit and receive a command or data with an external device (not shown) or another electronic device using a GPS, Bluetooth, BLE, Wi-Fi, NFC, or the like. Alternatively, a current location may be measured based on the received or detected wireless signal. The communication module 390 may perform wired and wireless communication with one external device and may simultaneously perform wired and wireless communication with a plurality of external devices.

The output device 310 may include a display. For example, the electronic device 300 may include a first a display and/or a second display (e.g., see 310 in FIG. 3 which may comprise at least one display). The first display and/or the second display may include at least one of, for example, a liquid crystal display (LCD), a digital mirror device (DMD), a liquid crystal on silicon (LCoS) device, an organic light emitting diode (OLED), or a micro light emitting diode (micro LED). For example, the display of the electronic device 300 may include at least one light source for radiating light. When the first display and/or the second display includes one of the LCD, the DMD, or the LCoS device, the electronic device 300 may include at least one light source which radiates light to a screen output region of the display. For another example, when the display of the electronic device 300 internally generates light, it may fail to include a separate light source except for the light source included in the display. When the first display and/or the second display includes at least one of the OLED or the micro LED, the electronic device 300 may provide a user with an image although not including a separate light source. When the display is implemented as the OLED or the micro LED, a weight of the electronic device 300 may be reduced by omitting a separate light source.

According to an example embodiment, the display of the electronic device 300 may be a transparent or semi-transparent display (e.g., see 310, 160). The display may be disposed at a position facing eyes of the user.

The electronic device 300 may include the at least one camera 340. For example, the camera 340 of the electronic device 300 may include a first camera, a second camera, and/or a third camera. For example, the first camera and the second camera may be used to recognize an external image. The first camera and the second camera may be configured to obtain an image corresponding to a direction (e.g., a +x direction) corresponding to a gaze of the user. The electronic device 300 may perform head tracking (e.g., 3 or 6 degree of freedom (DoF) tracking), hand image detection, hand image tracking, and/or space recognition using the first camera and the second camera. For example, the first camera and the second camera may be global shutter (GS) cameras having the same specifications and performance (e.g., an angle of view, a shutter speed, resolution, the number of color bits, and/or the like)

In an example embodiment, the electronic device 300 may support a simultaneous localization and mapping (SLAM) technology by performing space recognition (e.g., 6 DoF space recognition) and/or depth information acquisition using a stereo camera 340 disposed at the left/right. Furthermore, the electronic device 300 may recognize a gesture of the user using the stereo camera 340 disposed at the left/right. The electronic device 300 may detect a faster hand gesture and fine motion using a GS camera 340 having relatively less distortion than a rolling shutter (RS) camera. For example, the third camera may be used to recognize an external image. The third camera may be configured to obtain an image corresponding to a direction (e.g., a +x direction) corresponding to a gaze of the user.

In an example embodiment, the third camera may be a camera having relatively higher resolution than the first camera and the second camera. The third camera may be referred to as a high resolution (HR) camera or a photo video (PV) camera. The third camera may support functions, such as auto focus (AF) and/or optical image stabilization (OIS), for obtaining a high-definition image. The third camera may be a GS camera and/or an RS camera.

The sensor 320 may include an eye-tracking sensor, an infrared sensor, a motion sensor, or the like and may measure motion of an object. The motion sensor may include an accelerometer, a gyroscope, a barometer, a geomagnetic sensor, or the like and may measure motion of the object. The sensor 320 may identify a position, an access distance, a direction, a speed, or the like of the object to sense access of the object. The sensor 320 may deliver the sensed value to the processor 301. The processor 301 may obtain information about a user input based on the received value. The sensor 320 may be configured according to a type of information to be obtained.

In an example embodiment, the sensor 320 (comprising sensing circuitry) may include at least one eye-tracking sensor. For example, the electronic device 300 may include a first eye-tracking sensor and a second eye-tracking sensor. The first eye-tracking sensor and the second eye-tracking sensor may be configured to respectively obtain a right-eye image of the user and a left-eye image of the user. Although the camera 340 and the sensor 320 are separately shown, the camera 340 may function as the sensor 320. For example, the first eye-tracking sensor and the second eye-tracking sensor may be cameras configured to obtain an image in a direction corresponding to the eyes of the user.

In an example embodiment, the electronic device 300 may be configured to detect pupils of the user using the first eye-tracking sensor and the second eye-tracking sensor. The electronic device 300 may obtain a gaze of the user from a pupil image of the user and may provide an image based on the obtained gaze. For example, the electronic device 300 may display the image such that the image is located in a gaze direction of the user. For example, the first eye-tracking sensor and the second eye-tracking sensor may be global shutter (GS) cameras having the same specifications and performance (e.g., an angle of view, a shutter speed, resolution, the number of color bits, and/or the like)

In an embodiment, the sensor 320 may sense an electrical signal (electromyogram) of a muscle which minutely changes when a part of the human body changes in shape depending on a shape of a gesture which is a user input. For example, the sensor 320 may sense an electrical signal based on positions of two different fingers. The sensor 320, comprising at least one sensor, may deliver the sensed electrical signal value to the processor 301. The processor 301, comprising at least one processor, may determine positions of fingers making up a shape of a hand of the user input based on the received value.

According to an example embodiment, the processor 301 may process and display signals measured by the sensor 320 of the electronic device 300 on the output device 310. Feedback of a sound and/or vibration may be provided together to the electronic device 300 through the output device 310. Alternatively, another device may be controlled or data may be stored, via the communication module 390. The processor 301 may be configured with at least one or more processors and may be run by being physically divided into a main processor for performing high-performance processing and an auxiliary processor for performing low-power processing. At this time, the sensor 320 may be connected to the auxiliary processor to perform 24-hour monitoring. In an example embodiment, one processor may perform processing by switching between high performance and low power depending on a situation.

Hereinafter, the operation of the processor 301 will be described in detail according to an example embodiment.

In an example embodiment, an electronic device may include an at least partially transparent display, a camera, a memory, and a processor (e.g., 301, 120) operatively connected with the at least partially transparent display, the camera, and the memory. The memory may store instructions, when executed, cause the processor (comprising processing circuitry) to receive a first gesture input using a part of a human body of a user using the camera, receive an utterance input of the user in response to the first gesture input, display text generated based on a property of the utterance input on coordinates corresponding to a position of a part of the human body of the user on augmented reality (AR) provided by way of the at least partially transparent display, end the reception of the utterance input, when receiving an end gesture input using a part of the human body of the user using the camera, and provide/fix the displayed text in a specified position on the augmented reality (AR), in response to the received end gesture input.

In an embodiment, the end gesture may be a gesture having a similarity of a threshold or more with the first gesture.

The processor may receive a second gesture input having a similarity of a threshold or more with the first gesture using the camera, may edit the generated text depending on a function corresponding to the second gesture input, and may display the edited text on the at least partially transparent display.

In an embodiment, the function corresponding to the second gesture input may be adjusting at least one of a color, a size, a shape, or a slope of the generated text.

In an embodiment, the function corresponding to the second gesture input may be setting an open range of the generated text.

In an embodiment, the function corresponding to the second gesture input may be mapping to perform a predetermined operation, when the processor receives an input using the text fixed in the specified position on the AR.

In an embodiment, the processor may select one of selectable options of the function corresponding to the second gesture input based on the number of times of inputting the second gesture input.

In an embodiment, the processor may select one of selectable options using at least one the number of the selectable options and a similarity between the second gesture and the first gesture.

In an embodiment, the processor may determine coordinates to place the displayed text on the AR based on a change in position of the end gesture input, when receiving the end gesture input, and may fix the displayed text in a position corresponding to the determined coordinates.

In an embodiment, fixing the text may be placing the text such that the displayed text is displayed at a specified position on the AR.

Figure 4:
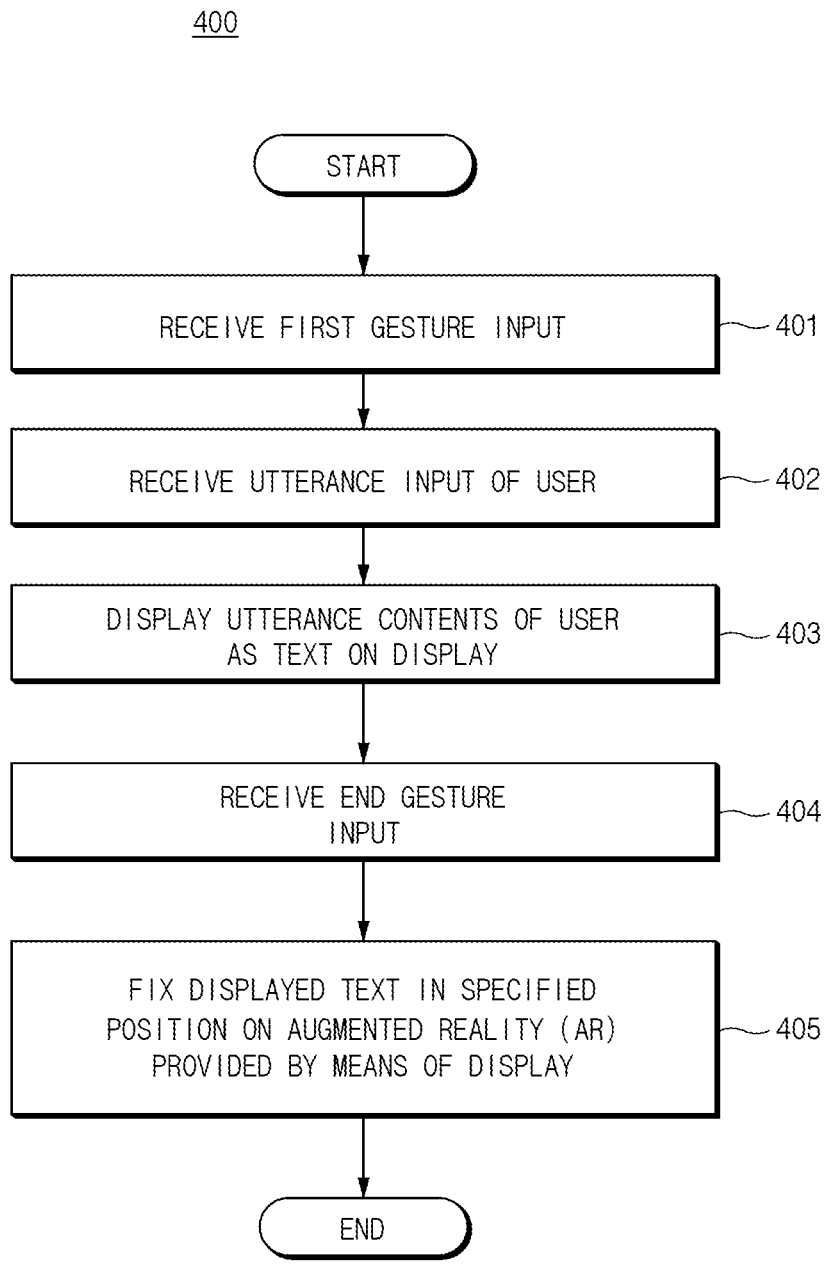
FIG. 4 is a flowchart of a method for processing an input of a user in an electronic device according to an embodiment.

FIG. 4 is a flowchart 400 illustrating a method for processing in an electronic device according to an example embodiment. FIG. 4 illustrates a flowchart of a method for receiving and processing a gesture input as a user input in the electronic device. The gesture input may refer to an input using an operation or an expression using a part of a human body. According to an embodiment, a process shown in FIG. 4 may be understood as being performed by executing instructions stored in a memory (e.g., a memory 130 of FIG. 1) at and/or in communication with a processor (e.g., a processor 120 of FIG. 1 and/or processor 301 of FIG. 3) of an electronic device (e.g., an electronic device 101 of FIG. 1, and/or electronic device 300 of FIG. 3).

In operation 401, the electronic device 101, 300 may receive a first gesture input. For example, the electronic device 101 may recognize the first gesture input using a sensor or a camera. The first gesture may be determined according to performance of the electronic device 101 and may be determined by a setting of a user.

In an embodiment, the electronic device 101 may recognize the first gesture input, while maintaining a screen which is being currently displayed. For example, the electronic device 101 may recognize the first gesture input using the camera in a state where it displays a virtual space screen or an augmented reality (AR) environment.

In operation 402, the electronic device 101, 300 may receive an utterance input of the user. For example, the electronic device 101 may receive the utterance input of the user using a microphone or the sensor. The utterance input of the user may refer to a voice input the user utters while maintaining the first gesture.

In an embodiment, the electronic device 101 may detect a user utterance using the microphone and may generate and receive a signal (or voice data) corresponding to the detected user utterance as an utterance input of the user.

In operation 403, in response to at least the utterance input of the user, the electronic device 101, 300 may convert contents included in the utterance input into text and may display the converted text on coordinates corresponding to a position of a part of the human body of the user on augmented reality (AR) provided on the at least partially transparent display (e.g., 310). For example, the electronic device 101 may convert and display the utterance input of the user into text using the camera (e.g., 340) and/or the sensor (e.g., 320).

In an embodiment, the electronic device 101, 300 may provide a speech recognition service by way of an intelligent app (or a speed recognition app) stored therein. For example, the electronic device 101 may recognize the utterance input of the user, which is received through the microphone, and may generate text corresponding to the recognized voice input. The electronic device 101 may display the generated text to provide the user with a service.

In an embodiment, the electronic device 101, 300 may generate text depending on a property of the utterance input. The property of the utterance input may refer to a feature or nature of the utterance input. For example, the property of the utterance input may include a magnitude of a voice received through the utterance input or a tone of the voice. In an embodiment, the larger the magnitude of the voice received through the utterance input, the larger the electronic device 101 may generate text to be in size of the text. Alternatively, the larger the tone of the voice received through the utterance input, the thicker the electronic device 101 may adjust text to be in thickness of the text to generate the text. The electronic device 101 may display the text generated according to the property of the utterance input.

In operation 404, the electronic device 101, 300 may receive an end gesture input. For example, the electronic device 101 may receive an end gesture of the user using the camera and/or the sensor. The end gesture may refer to a gesture derived from the first gesture. In an embodiment, the end gesture may be a gesture having a similarity of a threshold or more with the first gesture. The end gesture may be determined according to performance of the electronic device 101 and may be determined by a setting of the user. When the end gesture is recognized, the electronic device 101 may end the operation of receiving the utterance input of the user.

In operation 405, the electronic device 101, 300 may provide/fix the displayed text in a specific position on AR provided by way of the display. In an embodiment, fixing the displayed text in the specified position may refer to placing the text such that the displayed text is displayed at the specified position on the AR. In an embodiment, the electronic device 101 may determine coordinates to place the text and may fix the text in a position corresponding to the coordinates on the AR. In an embodiment, the electronic device 101 may determine the coordinates based on a change in position of the end gesture or the like.

According to an embodiment, because the electronic device 101, 300 is able to display text using only an utterance input without an additional input device (e.g., a keyboard or a mouse), it may more quickly and intuitively display the utterance input of the user as text.

Figure 5:
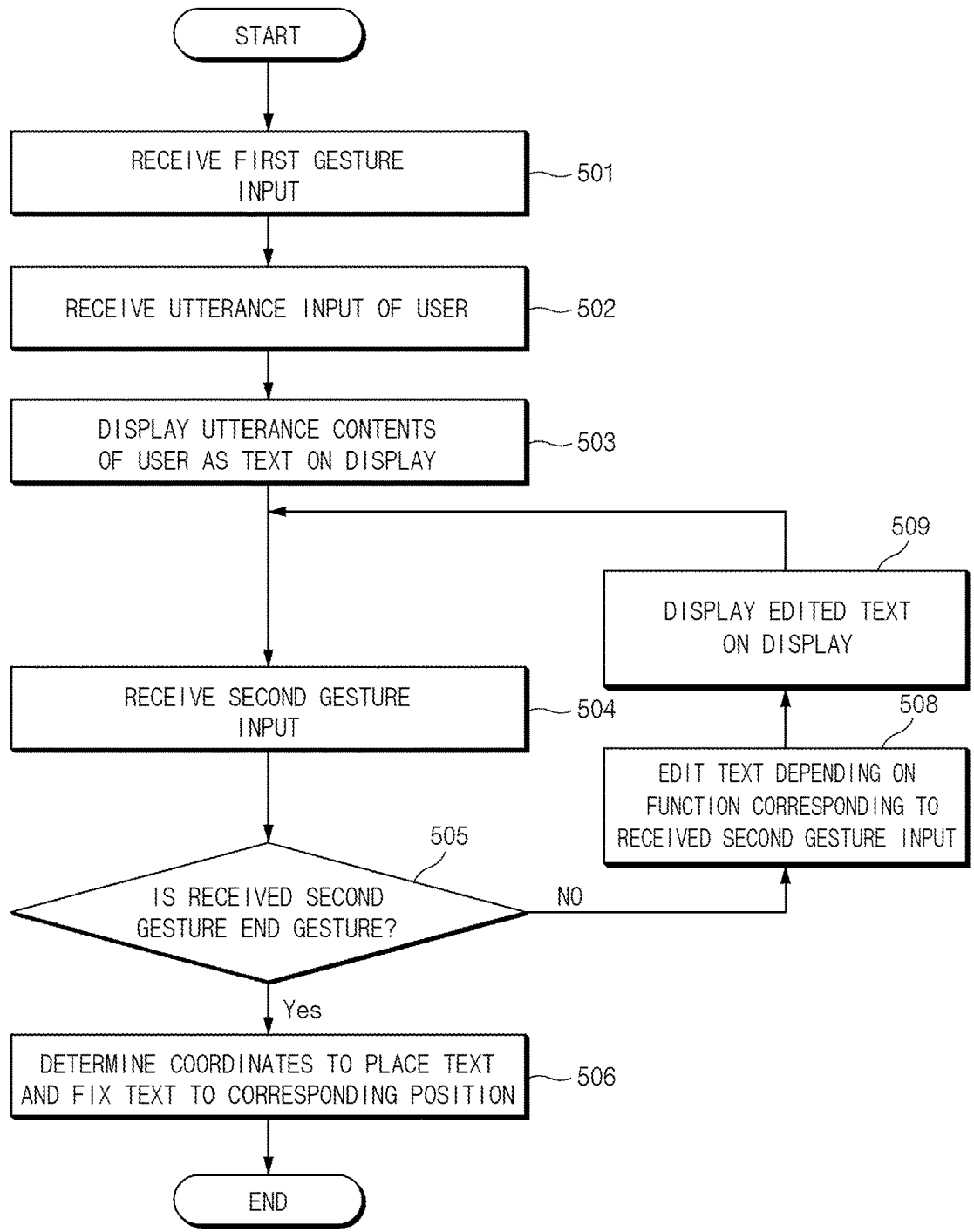
FIG. 5 is another flowchart of a method for processing an input of a user in an electronic device according to an embodiment.

FIG. 5 is another flowchart 500 of a method for processing an input of a user in an electronic device according to an example embodiment. FIG. 5 illustrates a flowchart of a method for receiving and processing a first gesture input and a second gesture input as user inputs in the electronic device. According to an example embodiment, a process shown in FIG. 5 may be understood as being performed by executing instructions stored in a memory (e.g., a memory 130 of FIG. 1) at and/or in communication with a processor (e.g., a processor 120 of FIG. 1 and/or processor 301 of FIG. 3) of an electronic device (e.g., an electronic device 101 of FIG. 1 or 300 of FIG. 3).

In operation 501, the electronic device 101, 300 may receive the first gesture input. For example, the electronic device 101 may recognize the first gesture input using a sensor and/or a camera. The first gesture may be determined according to performance of the electronic device 101 and may be determined by a setting of a user.

In an embodiment, the electronic device 101, 300 may recognize the first gesture input, while maintaining a screen which is being currently displayed. For example, the electronic device 101, 300 may recognize the first gesture input using the sensor or the camera in a state where it displays a virtual space screen or an augmented reality (AR) environment.

In operation 502, the electronic device 101, 300 may receive an utterance input of the user. For example, the electronic device 101, 300 may receive the utterance input of the user using a microphone and/or the sensor. The utterance input of the user may refer to a voice input the user utters while maintaining the first gesture.

In an embodiment, the electronic device 101, 300 may detect a user utterance using the microphone and may generate and receive a signal (or voice data) corresponding to the detected user utterance as an utterance input of the user.

In operation 503, the electronic device 101, 300 may convert and display contents included in the utterance input into text on its display, in response to the utterance input of the user. For example, the electronic device 101 may convert and display the utterance input of the user into text using the camera and/or the sensor.

In an embodiment, the electronic device 101, 300 may provide a speech recognition service via an intelligent app(s) (or a speed recognition app) stored therein. For example, the electronic device 101, 300 may recognize the utterance input of the user, which is received through the microphone, and may generate text corresponding to the recognized voice input. The electronic device 101, 300 may display the generated text to provide the user with a service.

In an embodiment, the electronic device 101, 300 may generate text depending on a property of the utterance input. The property of the utterance input may refer to a feature or nature of the utterance input. For example, the property of the utterance input may include a magnitude of a voice received through the utterance input or a tone of the voice. In an embodiment, the larger the magnitude of the voice received through the utterance input, the larger the electronic device 101 may generate text to be in size of the text. Alternatively, the larger the tone of the voice received through the utterance input, the thicker the electronic device 101 may adjust text to be in thickness of the text to generate the text. The electronic device 101 may display the generated text.

In operation 504, the electronic device 101, 300 may receive a second gesture input. The second gesture may refer to a gesture derived from the first gesture. The electronic device 101, 300 may receive the second gesture input using the camera and/or the sensor.

In operation 505, the electronic device 101, 300 may determine whether the received second gesture is the end gesture. The end gesture may be a gesture having a similarity of a threshold or more. When it is determined that the received second gesture is not the end gesture, the electronic device 101, 300 may perform operations 508 and 509.

In operation 508, the electronic device 101, 300 may edit utterance contents of the user depending on a function corresponding to the received second gesture input. For example, the electronic device 101, 300 may adjust a property of text depending on the function corresponding to the second gesture input of the user to edit the utterance contents of the user.

In an embodiment, the function corresponding to the second gesture input may be a function of adjusting at least one property among a slope of the text, a thickness of the text, transparency of the text, a size of the text, a type of a font of the text, or an open range of the text. In an embodiment, the function corresponding to the second gesture input may refer to an autocomplete function of completing the other portion, when inputting a portion of text.

In operation 509, the electronic device 101, 300 may display the edited utterance contents of the user on the display (e.g., 310). The electronic device 101, 300 may display the edited text to have the adjusted property value. In an embodiment, the electronic device 101, 300 may display a type of the adjusted property of the text and an indicator indicating a property value together.

On the other hand, when it is determined that the received second gesture is the end gesture in operation 505, the electronic device 101, 300 may perform operation 506.

In operation 506, the electronic device 101, 300 may determine coordinates to place the text and may fix the text in a position corresponding to the coordinates. In an embodiment, the electronic device 101, 300 may determine the coordinates based on a change in position of the end gesture or the like. In an embodiment, the electronic device 101, 300 may determine coordinates to place the displayed text and may fix the text in a corresponding position on AR provided via the display. When the end gesture is recognized, the electronic device 101, 300 may end the process of receiving and converting the utterance input of the user into the text.

According to an embodiment, because the electronic device 101, 300 is able to edit and display a property of text without necessarily needing an additional input device (e.g., a keyboard or a mouse), it may more quickly and intuitively display the utterance input of the user as text having a desired property in certain example embodiments.

In an embodiment, a method performed by an electronic device may include receiving a first gesture input using a part of a human body of a user using a camera included in the electronic device, receiving an utterance input of the user in response to the first gesture input, displaying text generated based on a property of the utterance input on coordinates corresponding to a position of a part of the human body of the user on augmented reality (AR) provided via an at least partially transparent display included in the electronic device, ending the reception of the utterance input, when receiving an end gesture input using a part of the human body of the user using the camera, and fixing the displayed text in a specified position on the AR, in response to the received end gesture input.

In an embodiment, the end gesture may be a gesture having a similarity of a threshold or more with the first gesture.

The method performed by the electronic device may further include receiving a second gesture input having a similarity of a threshold or more with the first gesture using a sensor included in the electronic device, editing the generated text depending on a function corresponding to the second gesture input, and displaying the edited text on the at least partially transparent display.

In an embodiment, the function corresponding to the second gesture input may be adjusting at least one of a color, a size, a shape, or a slope of the generated text.

In an embodiment, the function corresponding to the second gesture input may be setting an open range of the generated text.

In an embodiment, the function corresponding to the second gesture input may be mapping to perform a predetermined operation, when the electronic device receives an input using the text fixed in the specified position on the AR.

In an embodiment, the method performed by the electronic device may further include selecting one of selectable options of the function corresponding to the second gesture input based on the number of times of inputting the second gesture input.

In an embodiment, the method performed by the electronic device may further include selecting one of selectable options using at least one of the number of the selectable options and a similarity between the second gesture and the first gesture.

In an embodiment, the method performed by the electronic device may further include determining coordinates to place the displayed text on the AR based on a change in position of the end gesture input, when receiving the end gesture input, and fixing the displayed text in a position corresponding to a position of the determined coordinates.

In an embodiment, fixing the text may be placing the text such that the displayed text is displayed at a specified position on the AR.

Hereinafter, a description will be given in detail of the method(s) according to the flowcharts 400 and 500 of FIGS. 4 and 5, using the drawings of FIGS. 6 to 15.

Figure 6:
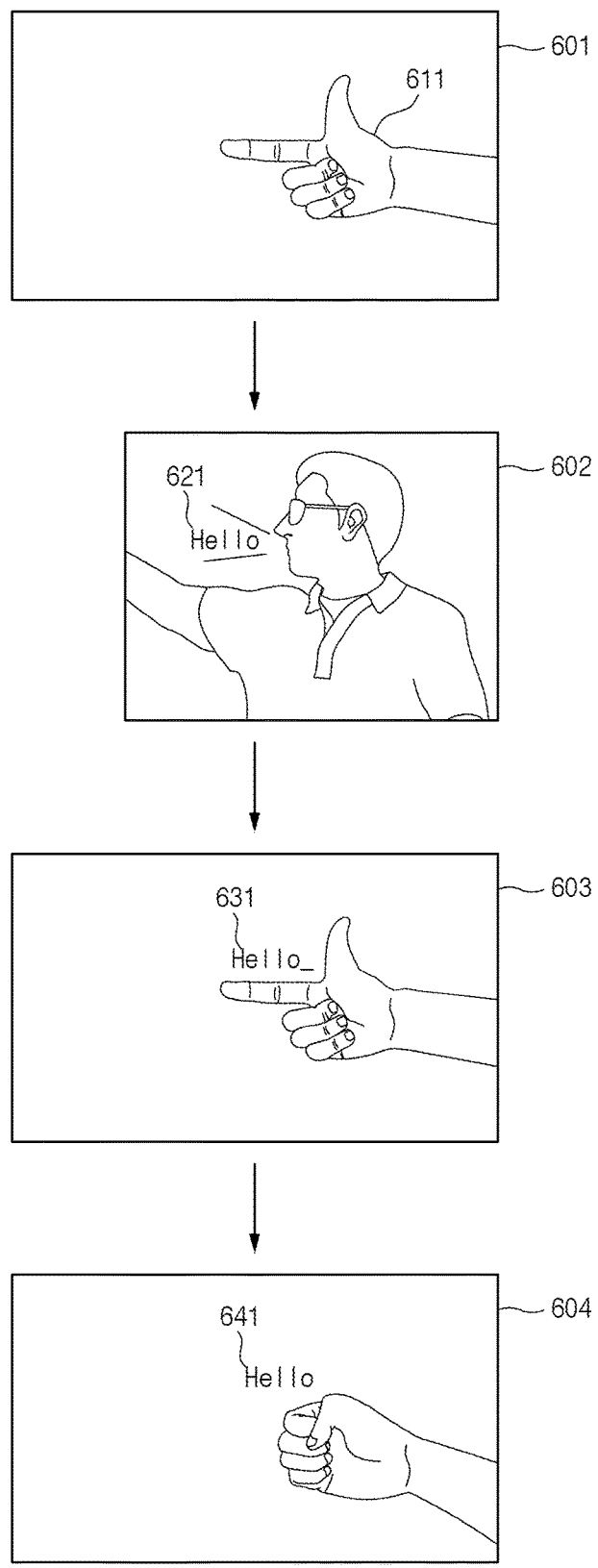
FIG. 6 is a drawing illustrating a method for processing a gesture input of a user in an example electronic device.

FIG. 6 is a drawing illustrating a method for processing a gesture input of a user in an electronic device 101 (and/or 300). Electronic device 101 as used herein may also refer to and/or include electronic device 300 of FIG. 3. FIG. 6 illustrates a method for recognizing a gesture using a hand of a user using a sensor or a camera and displaying text in an electronic device 101. In detail, FIG. 6 illustrates a gesture 611 in a state where both of a thumb and an index finger are spread as an example of a first gesture. This is illustrative, and the gesture is not limited to the hand. Furthermore, to help understanding, FIG. 6 illustrates a portion of a display (e.g., 310) of an electronic device 101.

FIG. 6 illustrates subsequent operations divided into a first state 601, a second state 602, a third state 603, and a fourth state 604 in order of time, but some or all of the first to fourth states may be subsequent operations.

In the first state 601, the electronic device 101 may recognize the first gesture 611 of the user using the camera and/or the sensor. The first gesture 611 may be determined according to performance of the electronic device 101 and may be determined by a setting of the user. When the first gesture 611 is recognized, the electronic device 101 may receive and convert an utterance input of the user into text.

In the second state 602, the electronic device 101 may receive an utterance input 621 of the user using a microphone or the sensor. The utterance input 621 of the user may refer to a voice input the user utters while maintaining the first gesture 611.

In an embodiment, the electronic device 101 may detect a user utterance using the microphone and may generate and receive a signal (or voice data) corresponding to the detected user utterance as the utterance input 621 of the user.

In the third state 603, the electronic device 101 may convert and display the utterance input 621 of the user into text 631 using the camera or the sensor, and may display the text 631.

In an embodiment, the electronic device 101 may provide a speech recognition service via an intelligent app (or a speed recognition app) stored therein. For example, the electronic device 101 may recognize the utterance input 621 of the user, which is received through the microphone, and may generate and display the text 631 corresponding to the recognized voice input.

In an embodiment, the electronic device 101 may generate the text 631 depending on a property of the utterance input 621. The property of the utterance input 621 may refer to a feature and/or nature of the utterance input. For example, the property of the utterance input 621 may include a magnitude of a voice received through the utterance input or a tone of the voice. In an embodiment, the larger the magnitude of the voice received through the utterance input 621, the larger the electronic device 101 may generate text 631 to be regarding size of the text. Alternatively, the larger the tone of the voice received through the utterance input 621, the thicker the electronic device 101 may adjust text 631 to be in thickness of the text to generate the text.

In the fourth state 604, the electronic device 101 may receive an end gesture 641 of the user using the camera and/or the sensor. The end gesture 641 may be determined according to performance of the electronic device 101 and may be determined by a setting of the user. When the end gesture 641 is recognized, the electronic device 101 may end the process of receiving and converting the utterance input of the user into the text.

In an embodiment, when receiving the end gesture 641, the electronic device 101 may determine coordinates to place text 631 and may fix the text in a position corresponding to the coordinates. In an embodiment, the electronic device 101 may determine the coordinates based on a change in position of the end gesture 641 or the like.

FIGS. 7 to 15 are other drawings illustrating a method for processing a gesture input of a user in an electronic device 101. In detail, FIGS. 7 to 11 are drawings illustrating a method for adjusting and displaying a property of text depending on a second gesture input of a user in the electronic device 101. The electronic device 101 may recognize a second gesture of the user using a camera and/or a sensor. The second gesture may refer to a gesture derived from a first gesture. For example, the second gesture may be a gesture having a similarity of a threshold or more with the first gesture.

Figure 7:
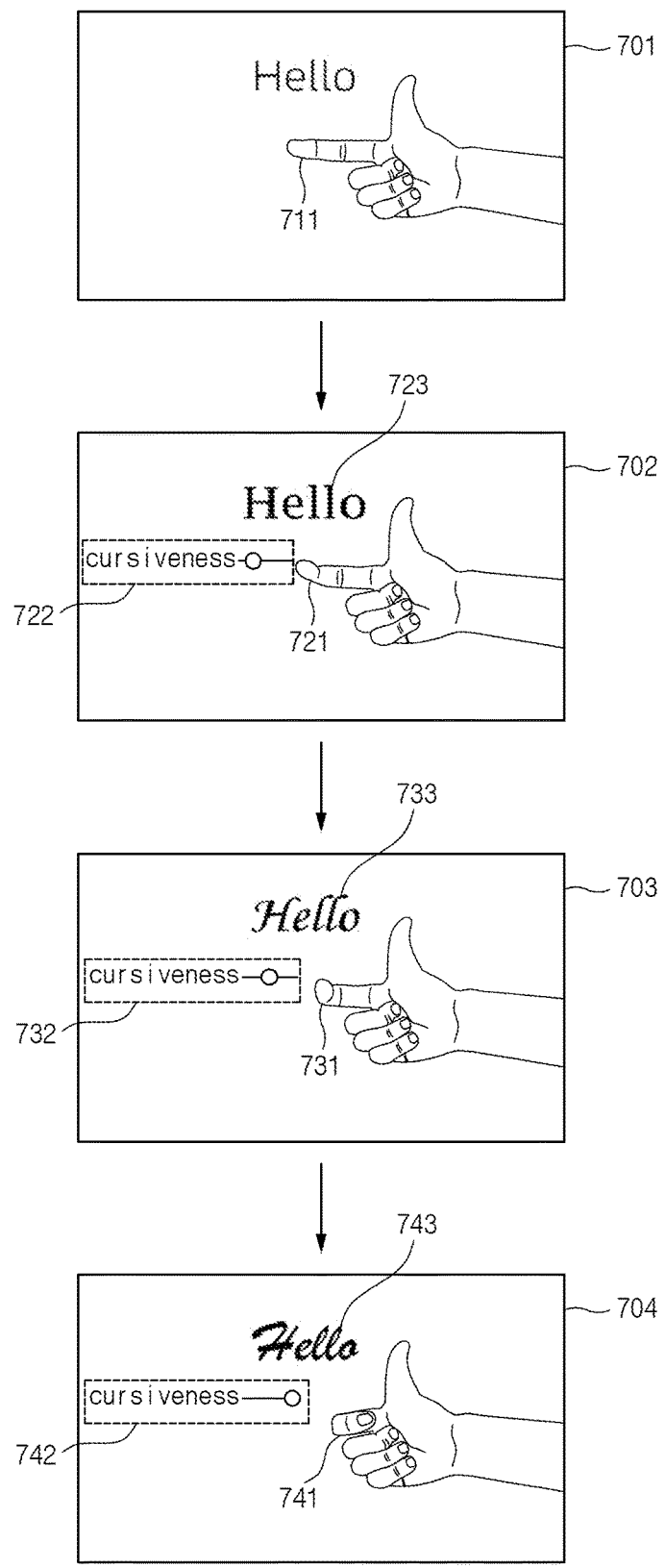
FIG. 7 is a drawing illustrating a method for adjusting and displaying a slope of text depending on a second gesture input of a user in an example electronic device.

FIG. 7 is a drawing illustrating a method for adjusting and displaying a slope of text depending on a second gesture input of the user in the electronic device 101. FIG. 7 illustrates a method for recognizing a gesture using a hand of the user using a sensor and/or a camera and adjusting a slope of text in the electronic device 101. In detail, FIG. 7 illustrates a gesture 711 in a state where both of a thumb and an index finger are spread as an example of a first gesture. FIG. 7 illustrates a gesture 721, 731, or 741 of bending an index finger in the state of the first gesture as an example of a second gesture. This is illustrative, and the gesture is not limited to the hand. Furthermore, to help understanding, FIG. 7 illustrates a portion of a display of the electronic device 101.

FIG. 7 illustrates subsequent operations divided into a first state 701, a second state 702, a third state 703, and a fourth state 704 in order of time, but some or all of the first to fourth states may be subsequent operations.

In the first state 701, the electronic device 101 may recognize the first gesture 711 of the user using the camera and/or the sensor and may convert and display an utterance input into text. The electronic device 101 may recognize the second gesture 721, 731, or 741 having a similarity of a threshold or more with the first gesture 711 using the camera or the sensor and may edit text.

In the second state 702, the electronic device 101 may recognize an input for the second gesture 721 of slightly bending an index finger from the first gesture 711. The electronic device 101 may adjust a slope value of text to a low value in response to the input for the second gesture 721 of slightly bending the index finger. The electronic device 101 may display an indicator 722 indicating the low slope value. The electronic device 101 may display text 723 edited to have a low slope value depending on the adjusted slope value.

In the third state 703, the electronic device 101 may recognize the input for the second gesture 731 of bending the index finger from the first gesture. The electronic device 101 may adjust a slope value of text to a middle value in response to the input for the second gesture 731 of bending the index finger. The electronic device 101 may display an indicator 732 indicating the middle slope value. The electronic device 101 may display text 733 edited to have a middle slope value depending on the adjusted slope value.

In the fourth state 704, the electronic device 101 may recognize an input for the second gesture 741 of fully bending the index finger from the first gesture. The electronic device 101 may adjust a slope value of text to a high value in response to the input for the second gesture 741 of bending the index finger. The electronic device 101 may display an indicator 742 indicating the high slope value. The electronic device 101 may display text 743 edited to have a high slope value depending on the adjusted slope value.

Figure 8:
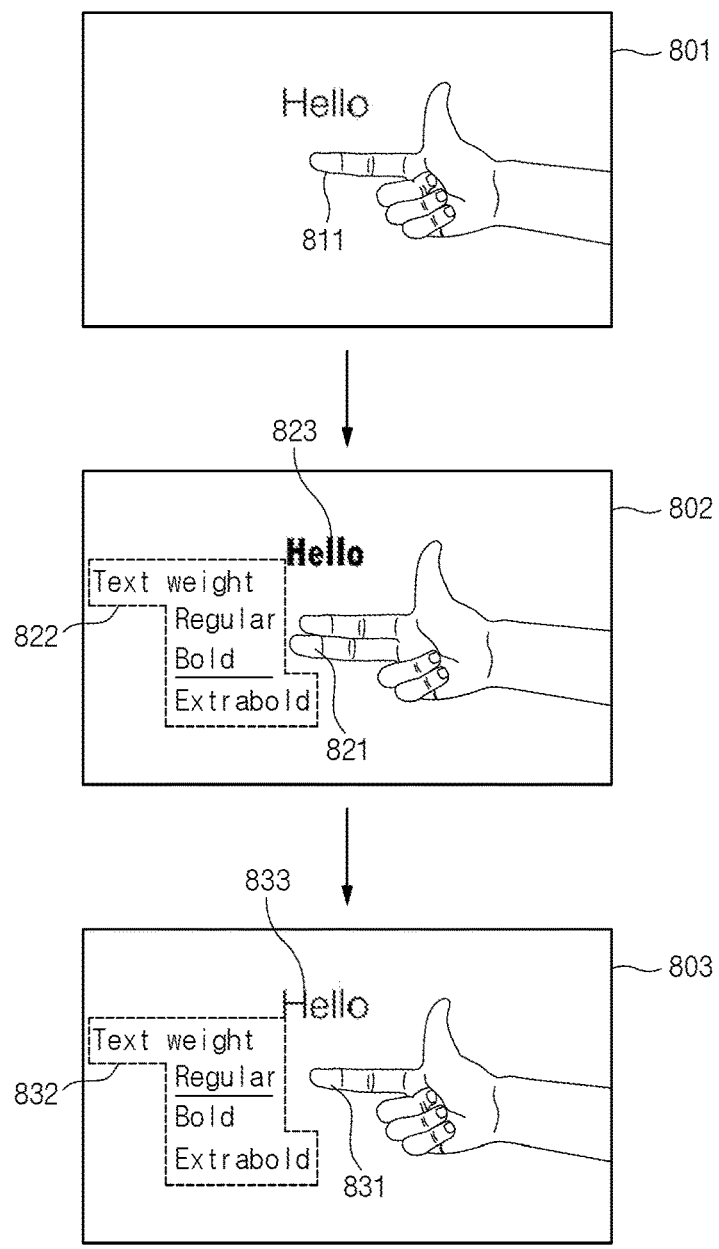
FIG. 8 is a drawing illustrating a method for adjusting and displaying a thickness of text depending on a second gesture input of a user in an example electronic device.

FIG. 8 is a drawing illustrating a method for adjusting and displaying a thickness of text depending on a second gesture input of a user in an electronic device 101. FIG. 8 illustrates a method for recognizing a gesture using a hand of the user using a sensor and/or a camera and adjusting a thickness of text in the electronic device 101. In detail, FIG. 8 illustrates a gesture 811 in a state where both of a thumb and an index finger are spread as an example of a first gesture. FIG. 8 illustrates a gesture 821 of further spreading a middle finger in the state of the first gesture as an example of a second gesture. This is illustrative, and the gesture is not limited to the hand. Furthermore, to help understanding, FIG. 8 illustrates a portion of a display of the electronic device 101.

FIG. 8 illustrates subsequent operations divided into a first state 801, a second state 802, and a third state 803 in order of time, but some or all of the first to third states may be subsequent operations.

In the first state 801, the electronic device 101 may recognize the first gesture 811 of the user using the camera and/or the sensor and may convert and display an utterance input into text (e.g., "Hello"). The electronic device 101 may recognize the second gesture 821 having a similarity of a threshold or more with the first gesture 811 using the camera and/or the sensor and may edit text.

In the second state 802, the electronic device 101 may recognize an input for the second gesture 821 of further spreading the middle finger from the first gesture. The electronic device 101 may adjust a thickness of text from being regular to being bold in response to the input for the second gesture 821 of further spreading the middle finger. The electronic device 101 may display an indicator 822 indicating a thickness value of the text adjusted to being bold. The electronic device 101 may display text 823 edited to have a bold value depending on the adjusted thickness value.

In the third state 803, the electronic device 101 may recognize an input for a first gesture 831 of bending the middle finger from the second gesture. The electronic device 101 may adjust the thickness value of the text again from being bold to being regular in response to the input for the first gesture 831 of bending the middle finger from the second gesture. The electronic device 101 may display an indicator 832 indicating the thickness value of the text adjusted to being regular. The electronic device 101 may display text 833 edited to have a regular value depending on the adjusted thickness value.

Figure 9:
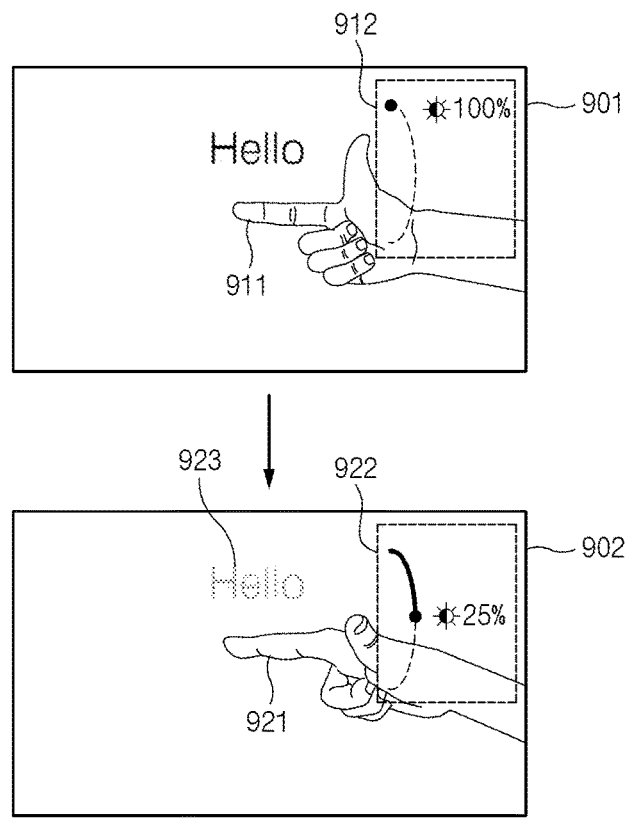
FIG. 9 is a drawing illustrating a method for adjusting and displaying a transparency of text depending on a second gesture input of a user in an example electronic device.

FIG. 9 is a drawing illustrating a method for adjusting and displaying a transparency of text depending on a second gesture input of a user in an electronic device 101. FIG. 9 illustrates a method for recognizing a gesture using a hand of the user using a sensor or a camera and adjusting a transparency of text in the electronic device 101. In detail, FIG. 9 illustrates a gesture 911 in a state where both of a thumb and an index finger are spread as an example of a first gesture. FIG. 9 illustrates a gesture 921 in a state where the palm faces down with the arm as an axis in the state of the first gesture as an example of a second gesture. This is illustrative, and the gesture is not limited to the hand. Furthermore, to help understanding, FIG. 9 illustrates a portion of a display of the electronic device 101.

FIG. 9 illustrates subsequent operations divided into a first state 901 and a second state 902 in order of time, and some or all of the first state and the second state may be subsequent operations.

In the first state 901, the electronic device 101 may recognize the first gesture 911 of the user using the camera or the sensor and may convert and display an utterance input into text. The electronic device 101 may recognize the second gesture 921 having a similarity of a threshold or more with the first gesture 911 using the camera or the sensor and may edit text.

In the second state 902, the electronic device 101 may recognize an input for the second gesture 921 in the state in which the palm faces down with the arm as the axis in the state of the first gesture. The electronic device 101 may adjust a transparency of text to 25 percentages in response to the input for the gesture 921 in the state in which the palm faces down with the arm as the axis. The electronic device 101 may display an indicator 922 indicating a transparency value of the text adjusted to the 25 percentages. The electronic device 101 may display text 923 edited to have the transparency of 25 percentages depending on the adjusted transparency value.

Figure 10:
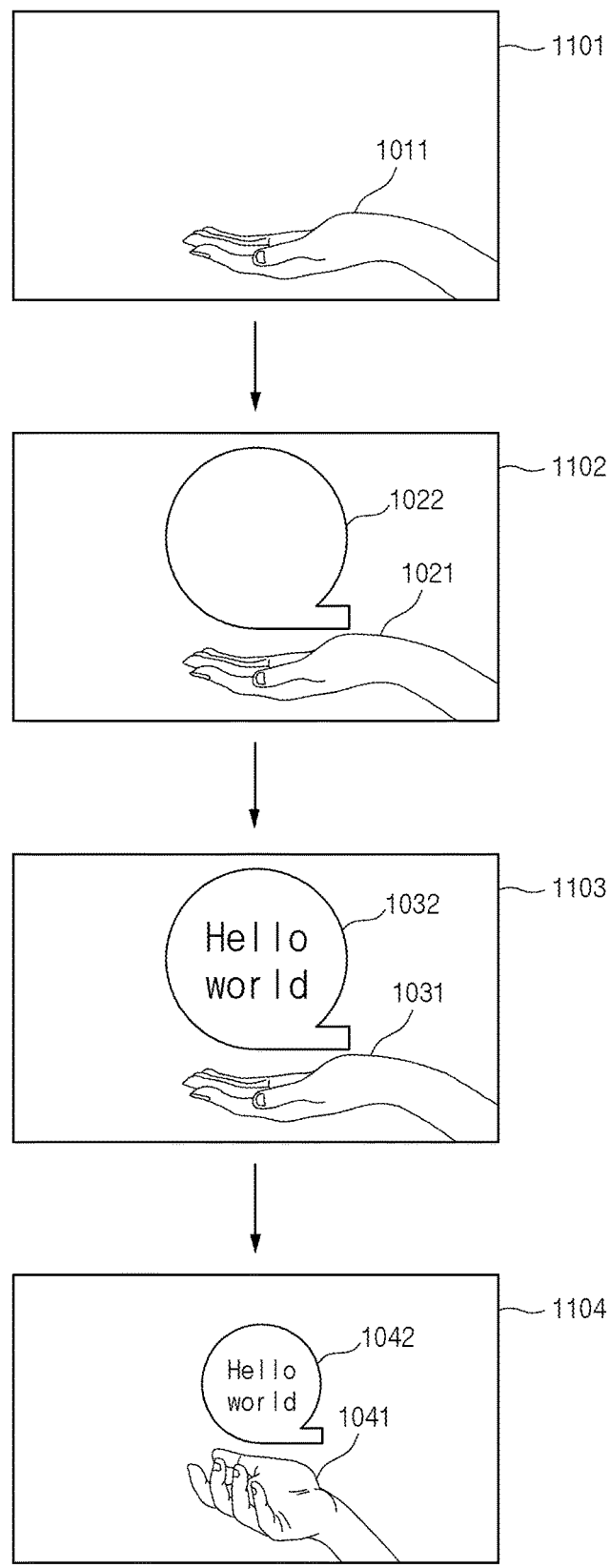
FIG. 10 is a drawing illustrating a method for adjusting and displaying a size of text depending on a second gesture input of a user in an example electronic device.

FIG. 10 is a drawing illustrating a method for adjusting and displaying a size of text depending on a second gesture input of a user in an electronic device 101. FIG. 10 illustrates a method for recognizing a gesture using a hand of the user using a sensor or a camera and adjusting a size of text in the electronic device 101. In detail, FIG. 10 illustrates a gesture 1011, 1021, or 1031 in a state where all of fingers are spread such that the palm faces the sky as an example of a first gesture. FIG. 10 illustrates a gesture 1041 in a state where fingers are somewhat rolled up in the state of the first gesture as an example of a second gesture. This is illustrative, and the gesture is not limited to the hand. Furthermore, to help understanding, FIG. 10 illustrates a portion of a display of the electronic device 101.

FIG. 10 illustrates subsequent operations divided into a first state 1001, a second state 1002, a third state 1003, and a fourth state 1004 in order of time, but some or all of the first to fourth states may be subsequent operations.

In the first state 1001, the electronic device 101 may recognize the first gesture 1011 of the user using the camera or the sensor. The first gesture 1011 may be determined according to performance of the electronic device 101 and may be determined by a setting of the user. When the first gesture 1011 is recognized, the electronic device 101 may receive and convert an utterance input of the user into text.

In the second state 1002, the electronic device 101 may receive an utterance input of the user using a microphone and/or the sensor. The utterance input of the user may refer to a voice input the user utters while maintaining the first gesture 1021. In an embodiment, the electronic device 101 may detect a user utterance using the microphone and may generate and receive a signal (or voice data) corresponding to the detected user utterance as an utterance input of the user.

When recognizing the utterance input, the electronic device 101 may display an icon indicating a region to display the utterance input. In an embodiment, when recognizing the utterance input, the electronic device 101 may display a drop-shape icon 1022.

In the third state 1003, the electronic device 101 may convert and display an utterance input 1032 of the user into text 1032 using the camera and/or the sensor.

In an embodiment, the electronic device 101 may provide a speech recognition service via an intelligent app(s) (or a speed recognition app) stored therein. For example, the electronic device 101 may recognize the utterance input of the user, which is received through the microphone, and may generate and provide text 1032 corresponding to the recognized voice input to the user.

In the fourth state 1004, the electronic device 101 may recognize an input for the second gesture 1041 in the state in which the fingers are at least partially rolled up in the state from the first gesture. The electronic device 101 may adjust a size value of text to be small in response to the input for the second gesture 1041 in the state in which the fingers are rolled up. The electronic device 101 may display an indicator (not shown) indicating a size value of the adjusted text. The electronic device 101 may display text 1042 edited to have the adjusted size value.

Figure 11:
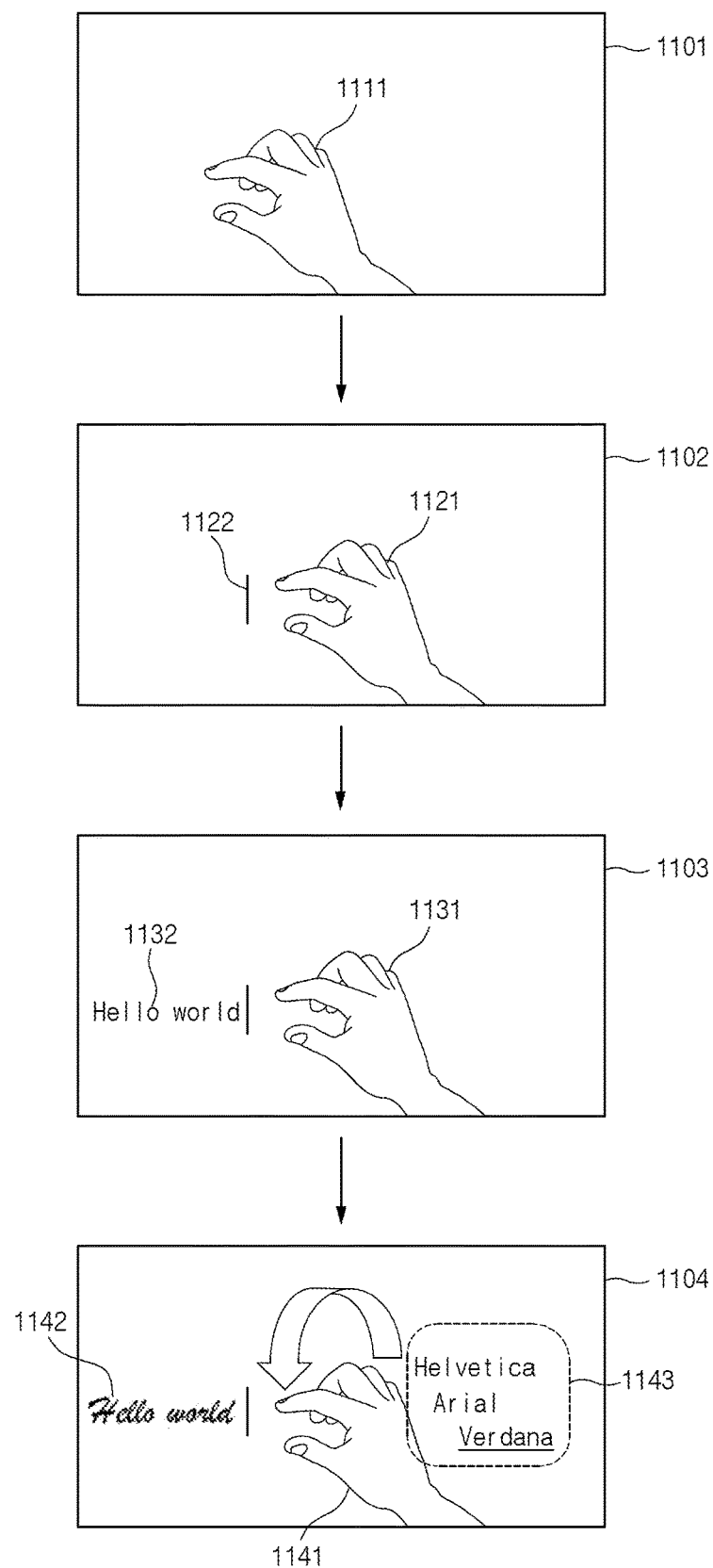
FIG. 11 is a drawing illustrating a method for adjusting and displaying a font of text depending on a second gesture input of a user in an example electronic device.

FIG. 11 is a drawing illustrating a method for adjusting and displaying a font of text depending on a second gesture input of a user in an electronic device 101. FIG. 11 illustrates a method for recognizing a gesture using a hand of the user using a sensor and/or a camera and adjusting a font of text in the electronic device 101. In detail, FIG. 11 illustrates a gesture 1111, 1121, or 1131 in a state showing a gap using a thumb and an index finger as an example of a first gesture. FIG. 11 illustrates a gesture 1141 of rotating a wrist in the state of the first gesture as an example of a second gesture. This is illustrative, and the gesture is not limited to the hand. Furthermore, to help understanding, FIG. 11 illustrates a portion of a display of the electronic device 101.

FIG. 11 illustrates subsequent operations divided into a first state 1101, a second state 1102, a third state 1103, and a fourth state 1104 in order of time, but some or all of the first to fourth states may be subsequent operations.

In the first state 1101, the electronic device 101 may recognize the first gesture 1111 of the user using the camera and/or the sensor. The first gesture 1111 may be determined according to performance of the electronic device 101 and may be determined by a setting of the user. When the first gesture 1111 is recognized, the electronic device 101 may receive and convert an utterance input of the user into text.

In the second state 1102, the electronic device 101 may receive an utterance input of the user using a microphone or the sensor. The utterance input of the user may refer to a voice input the user utters while maintaining the first gesture 1121. In an embodiment, the electronic device 101 may detect a user utterance using the microphone and may generate and receive a signal (or voice data) corresponding to the detected user utterance as an utterance input of the user.

When recognizing the utterance input, the electronic device 101 may display an icon indicating a region to display the utterance input. In an embodiment, when recognizing the utterance input, the electronic device 101 may display a cursor-shape icon 1122.

In the third state 1103, the electronic device 101 may convert and display an utterance input of the user into text 1132 using the camera and/or the sensor.

In an embodiment, the electronic device 101 may provide a speech recognition service via an intelligent app(s) (or a speed recognition app) stored therein. For example, the electronic device 101 may recognize the utterance input 1121 of the user, which is received through the microphone, and may generate and provide the text 1132 corresponding to the recognized voice input to the user.

In the fourth state 1104, the electronic device 101 may recognize an input for the second gesture 1141 in the state in which the wrist rotates compared to the state of the first gesture. The electronic device 101 may adjust a font of text in response to the input for the second gesture 1141 in the state in which the wrist rotates. The electronic device 101 may display an indicator 1143 indicating a type of a selectable font and a currently selected font. The electronic device 101 may display text 1142 edited to have the adjusted font.

Figure 12:
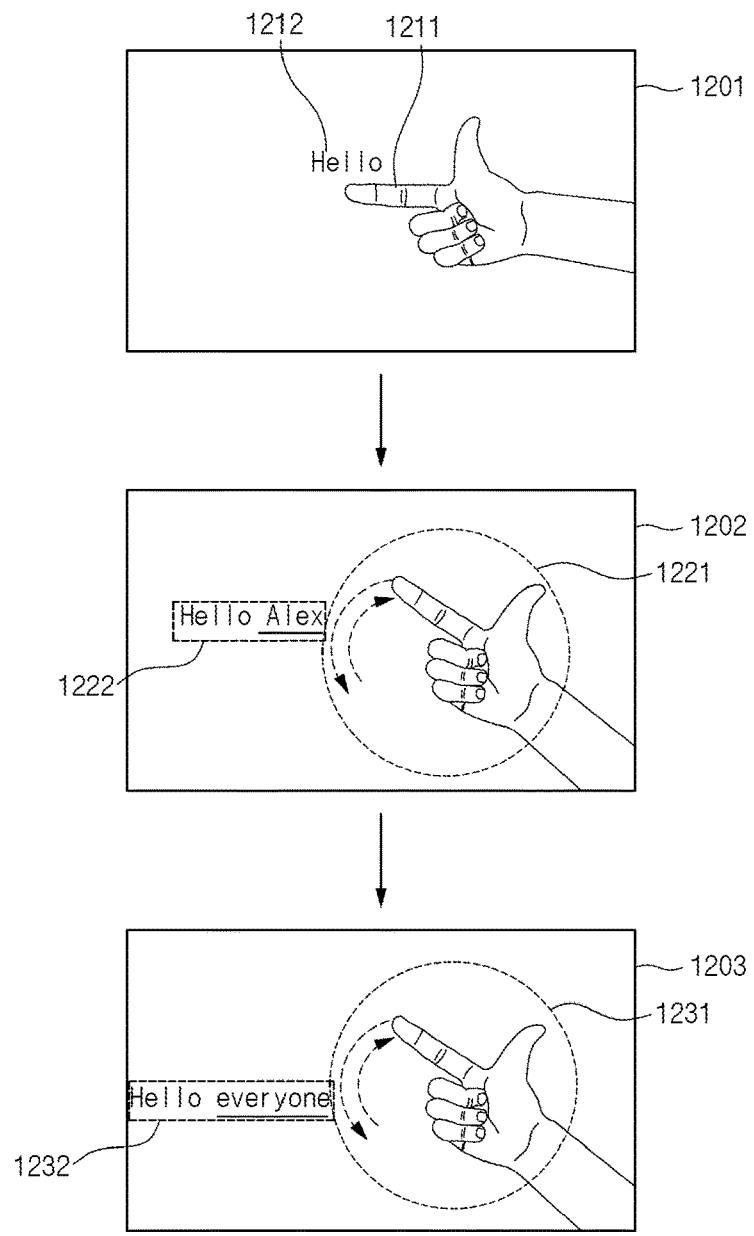
FIG. 12 is a drawing illustrating a method for adjusting an autocomplete function of text depending on a second gesture input of a user in an example electronic device.

FIG. 12 is a drawing illustrating a method for adjusting an autocomplete function of text depending on a second gesture input of a user in an electronic device 101. FIG. 12 illustrates a method for recognizing a gesture using a hand of the user using a sensor or a camera and adjusting the autocomplete function of text in the electronic device 101. In detail, FIG. 12 illustrates a gesture 1211 in a state where both of a thumb and an index finger are spread as an example of a first gesture. FIG. 12 illustrates a gesture 1221 or 1231 in a state where the wrist is waved up and down in the state of the first gesture as an example of a second gesture. This is illustrative, and the gesture is not limited to the hand. Furthermore, to help understanding, FIG. 12 illustrates a portion of a display of the electronic device 101.

FIG. 12 illustrates subsequent operations divided into a first state 1201, a second state 1202, and a third state 1203 in order of time, but some or all of the first to third states may be subsequent operations.

In the first state 1201, the electronic device 101 may recognize the first gesture 1211 of the user using the camera and/or the sensor and may convert and display an utterance input into text 1212. The electronic device 101 may recognize the second gesture 1221 or 1231 having a similarity of a threshold or more with the first gesture 1211 using the camera and/or the sensor and may edit text.

In the second state 1202, the electronic device 101 may recognize an input for the second gesture 1221 in the state where the wrist is waved up and down relative to the state of the first gesture. The electronic device 101 may select a next option of a currently selected option among autocomplete options and may automatically complete text in response to the input for the second gesture 1221 in the state where the wrist is waved up and down. When the autocomplete function is not currently selected, the electronic device 101 may select a first option, Alex, in response to the input for the gesture 1221 in the state where the wrist is waved up and down. The electronic device 101 may display the automatically completed text 1222 using the selected Alex.

In the third state 1203, the electronic device 101 may recognize an input for the second gesture 1231 once more in the state where the wrist is waved up and down relative to the state of the first gesture 1211. The electronic device 101 may select a next option of a currently selected option among autocomplete options and may automatically complete text in response to the input for the second gesture 1231 in the state where the wrist is waved up and down. For example, when the first option is currently selected, the electronic device 101 may select a second option, everyone, in response to the input for the gesture 1231 in the state where the wrist is waved up and down. The electronic device 101 may display the automatically completed text 1232 using the selected everyone.

Figure 13:
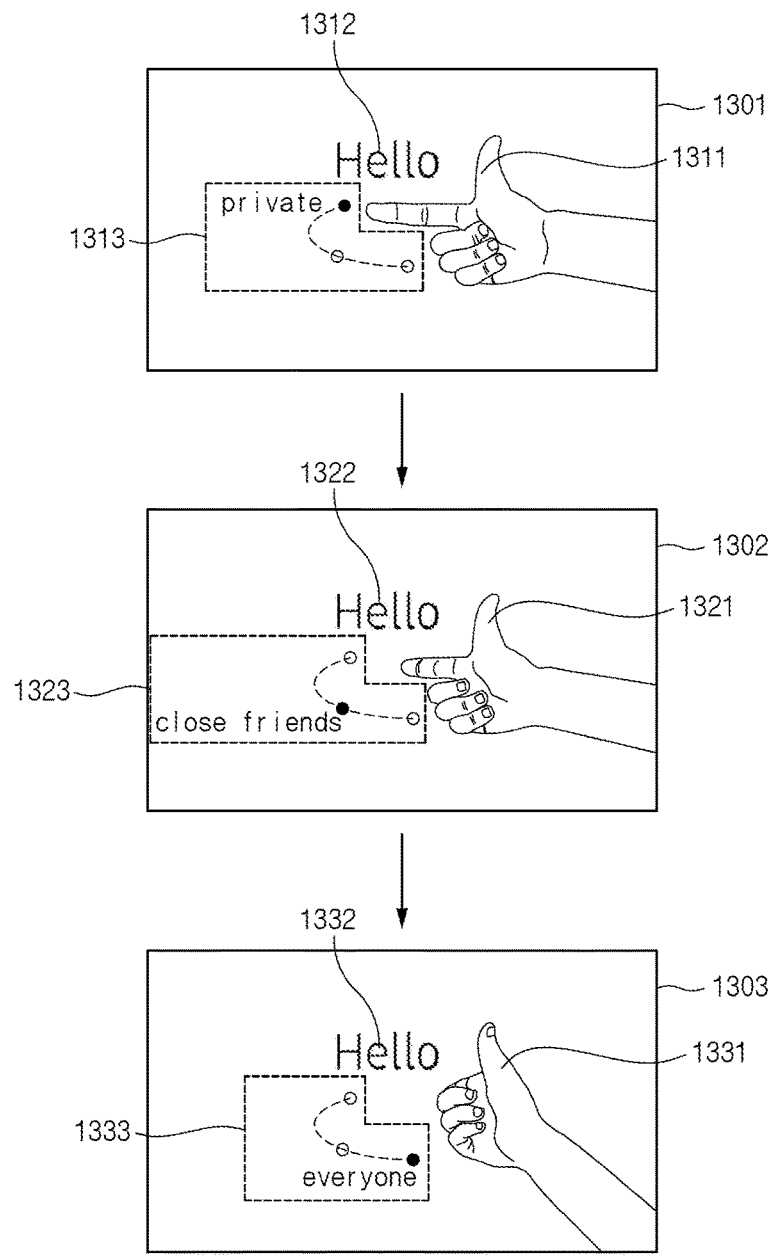
FIG. 13 is a drawing illustrating a method for adjusting a sharing range of text depending on a second gesture input of a user in an example electronic device.

FIG. 13 is a drawing illustrating a method for adjusting a sharing range of text depending on a second gesture input of a user in an electronic device 101. FIG. 13 illustrates a method for recognizing a gesture using a hand of the user using a sensor or a camera and adjusting the sharing range of text in the electronic device 101. In detail, FIG. 13 illustrates a gesture 1311 in a state where both of a thumb and an index finger are spread as an example of a first gesture. FIG. 13 illustrates a gesture 1321 or 1331 in a state where the wrist rotates back and forth with the arm as an axis in the state of the first gesture as an example of a second gesture. This is illustrative, and the gesture is not limited to the hand. Furthermore, to help understanding, FIG. 13 illustrates a portion of a display of the electronic device 101.

FIG. 13 illustrates subsequent operations divided into a first state 1301, a second state 1302, and a third state 1303 in order of time, but some or all of the first to third states may be subsequent operations.

In the first state 1301, the electronic device 101 may recognize the first gesture 1311 of the user using the camera or the sensor and may convert and display an utterance input into text 1312. The electronic device 101 may display an indicator 1313 indicating an open range of text. The electronic device 101 may adjust the open range of text depending on a default value in response to an input for the first gesture 1311. For example, the electronic device 101 may adjust the open range of text to a private step in response to an input for the first gesture 1311.

The electronic device 101 may recognize the second gesture 1321 or 1331 having a similarity of a threshold or more with the first gesture 1311 using the camera and/or the sensor and may change the open range of text.

In the second state 1302, the electronic device 101 may recognize an input for the second gesture 1321 in the state in which the wrist rotates back with the arm relative to the axis in the state of the first gesture 1311. The electronic device 101 may adjust the open range of the text to a next step in response to the input for the second gesture 1321 in the state where the wrist rotates back with the arm as the axis. For example, when the current open range is the private step, the electronic device 101 may adjust the open range of the text to a next step, a close friends step, in response to the input for the second gesture 1321.

The electronic device 101 may display an indicator 1323 indicating the open range of the text adjusted to the close friends step. The electronic device 101 may display text 1322 edited to be open to close friends depending on the adjusted open range step.

In the third state 1302, the electronic device 101 may recognize an input for the second gesture 1331 in the state in which the wrist rotates back with the arm as the axis in the second state. The electronic device 101 may adjust the open range of the text to a next step in response to the input for the gesture 1331 in the state where the wrist rotates back with the arm as the axis. For example, when the current open range is the close friends step, the electronic device 101 may adjust the open range of the text to a next step, an everyone step, in response to the input for the second gesture 1331.

The electronic device 101 may display an indicator 1333 indicating the open range of the text adjusted to the everyone step. The electronic device 101 may display text 1332 edited to be open to everyone depending on the adjusted open range step.

Figure 14:
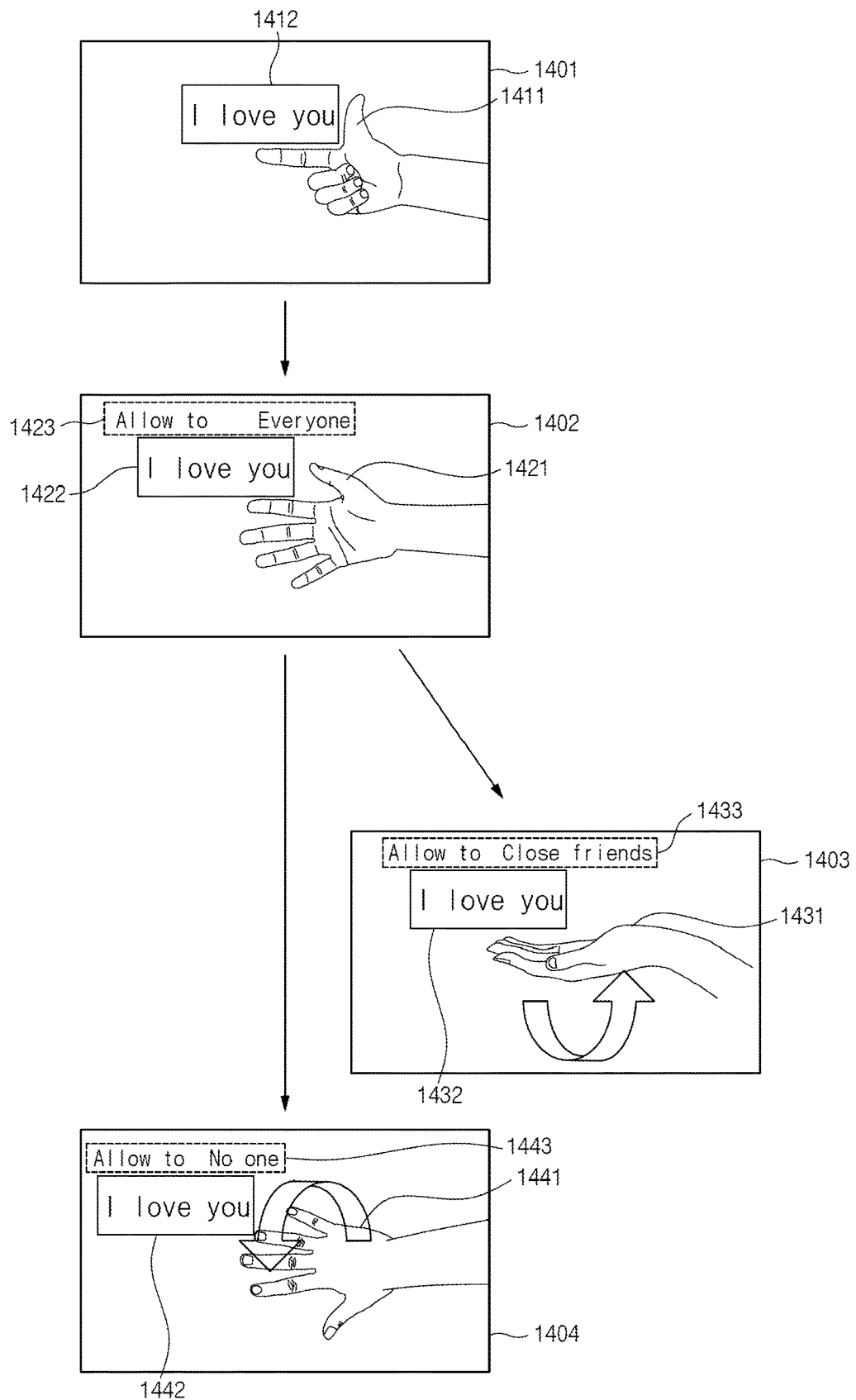
FIG. 14 is another drawing illustrating a method for adjusting a sharing range of text depending on a second gesture input of a user.

FIG. 14 is another drawing illustrating a method for adjusting a sharing range of text depending on a second gesture input of a user in an example electronic device 101. FIG. 14 illustrates another method for recognizing a gesture using a hand of the user using a sensor and/or a camera and adjusting the sharing range of text in the electronic device 101. In detail, FIG. 14 illustrates a gesture 1411 in a state where both of a thumb and an index finger are spread as an example of a first gesture. FIG. 14 illustrates a gesture 1421 in a state where all of the other fingers are spread compared to the state of the first gesture as an example of a second gesture 1421. FIG. 14 illustrates a gesture 1431 or 1441 in a state where the direction of the palm rotates in the state of the second gesture as an example of a third gesture. The third gesture may refer to a gesture having a similarity of a threshold or more with the second gesture. This is illustrative, and the gesture is not limited to the hand. Furthermore, to help understanding, FIG. 14 illustrates a portion of a display of the electronic device 101.

FIG. 14 illustrates subsequent operations divided into a first state 1401, a second state 1402, a third state 1403, and a fourth state 1404 in order of time, but some or all of the first to fourth states may be subsequent operations.

In the first state 1401, the electronic device 101 may recognize the first gesture 1411 of the user using the camera or the sensor and may convert and display an utterance input into text 1412 (e.g., "I love you"). The electronic device 101 may recognize the second gesture 1421 having a similarity of a threshold or more with the first gesture 1411 using the camera and/or the sensor and may execute a function capable of adjusting an open range of text.

In the second state 1402, the electronic device 101 may recognize an input for the second gesture 1421 in the state where all the other fingers are spread. The electronic device 101 may execute the function capable of adjusting the open range of the text in response to the input for the second gesture 1421 in which all the other fingers are spread. The electronic device 101 may display an indicator 1423 indicating the open range of the text 1422. The electronic device 101 may adjust the open range of the text depending on a default value in response to an input for the second gesture 1421. For example, the electronic device 101 may adjust the open range of the text to an everyone status in response to an input for the second gesture 1421. The electronic device 101 may display text 1423 edited to be open to everyone depending on the adjusted open range step.

The electronic device 101 may recognize the third gesture 1431 or 1441 having a similarity of a threshold or more with the second gesture 1421 using the camera or the sensor and may change the open range of the text based thereon.

In the third state 1403, the electronic device 101 may recognize an input for the third gesture 1431 in the state in which the direction of the palm rotates to face the sky in the second state. The electronic device 101 may adjust the open range of the text to a previous step in response to the input for the third gesture 1431 in the state where the direction of the palm rotates to face the sky in the second state. For example, when the current open range is the everyone status, the electronic device 101 may adjust the open range of the text to a previous step, a close friends step, in response to the input for the third gesture 1431 in the state where the direction of the palm rotates to face the sky in the second state.

The electronic device 101 may display an indicator 1433 indicating the open range of the text adjusted to the close friends step. The electronic device 101 may display text 1432 edited to be open to close friends depending on the adjusted open range step.

In the fourth state 1404, the electronic device 101 may recognize an input for the third gesture 1441 in a state in which the direction of the palm rotates to face a side opposite to the first state in the second state. The electronic device 101 may adjust the openness range of the text to a next step in response to the input for the third gesture 1441 in the state where the direction of the palm rotates to face the side opposite to the first state. For example, when the current open range is the everyone step, the electronic device 101 may adjust the open range of the text to a next step, a no one status 1443, in response to the input for the third gesture 1441 in the state where the direction of the palm rotates to face the side opposite to the first state.

The electronic device 101 may display an indicator 1443 indicating the open range of the text adjusted to the no one status. The electronic device 101 may display text 1442 edited to be open to no one depending on the adjusted open range step.

Figure 15:
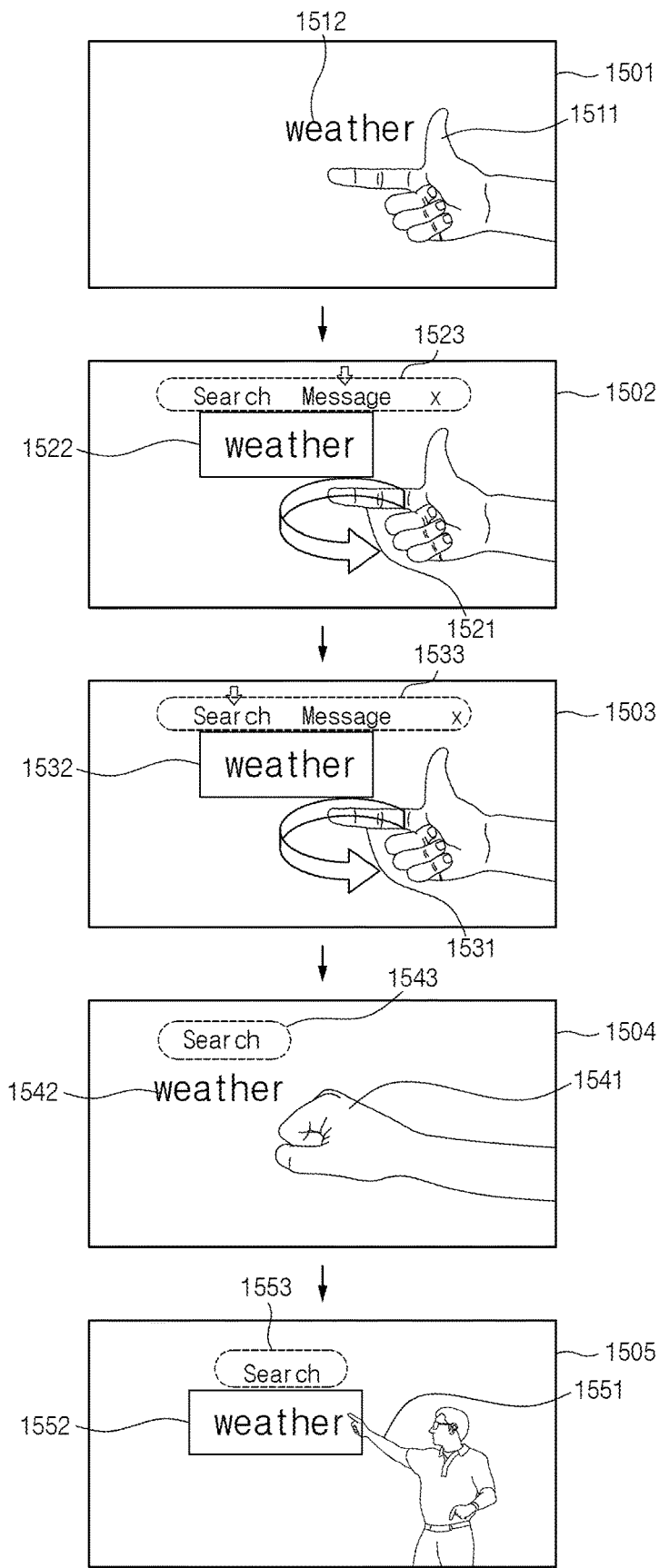
FIG. 15 is a drawing illustrating a method for mapping a function to text depending on a second gesture input of a user.

FIG. 15 is a drawing illustrating a method for mapping a function to text depending on a second gesture input of a user in an electronic device 101. FIG. 15 illustrates a method for recognizing a gesture using a hand of the user using a sensor and/or a camera and mapping the function to the text in the electronic device 101. In detail, FIG. 15 illustrates a gesture 1511 in a state where a thumb and an index finger are spread as an example of a first gesture. FIG. 15 illustrates a gesture 1521 or 1531 of an operation of folding and unfolding an index finger relative to the state the first gesture 1511 as an example of a second gesture. FIG. 15 illustrates a gesture 1541 in a state where the first is clenched as an example of an end gesture. This is illustrative, and the gesture is not limited to the hand. Furthermore, to help understanding, FIG. 15 illustrates a portion of a display of the electronic device 101.

FIG. 15 illustrates subsequent operations divided into a first state 1501, a second state 1502, a third state 1503, a fourth state 1504, and a fifth state 1505 in order of time, but some or all of the first to fifth states may be subsequent operations.

In the first state 1501, the electronic device 101 may recognize the first gesture 1511 of the user using the camera and/or the sensor and may convert and display an utterance input into text 1512. The electronic device 101 may recognize the second gesture 1521 having a similarity of a threshold or more with the first gesture 1511 using the camera and/or the sensor and may execute the function of mapping the function to text.

In the second state 1502, the electronic device 101 may recognize an input for the second gesture 1521 of folding and unfolding an index finger in the state of the first gesture. The electronic device 101 may display an indicator 1523 indicating a type of the function capable of being mapped to text and a currently selected function.

The electronic device 101 may adjust a function to be mapped to text in response to the input for the second gesture 1521 of folding and unfolding the index finger. For example, the electronic device 101 may display a search function, a message function, and x referring to no function, which are functions capable of being mapped to text. The electronic device 101 may select the message function as the function to be mapped to text in response to the input for the second gesture 1521. The electronic device 101 may display an arrow indicating that the message function is the currently selected function.

The electronic device 101 may display text 1522 to the message function is mapped.

In the third state 1503, the electronic device 101 may recognize an input for the second gesture 1531 of folding an unfolding the index finger in the state of the first gesture. The electronic device 101 may display an indicator 1533 indicating a type of the function capable of being mapped to text and a currently selected function in response to the input for the second gesture 1531.

The electronic device 101 may select a function to be mapped to text in response to the input for the second gesture 1531 of folding and unfolding the index finger. For example, the electronic device 101 may display the search function, the message function, and x referring to no function, which are functions capable of being mapped to text. The electronic device 101 may select the search function as the function to be mapped to text in response to the input for the second gesture 1531. The electronic device 101 may display an arrow indicating that the search function is the currently selected function.

The electronic device 101 may display text 1522 to the search function is mapped.

In the fourth state 1504, the electronic device 101 may receive an end gesture 1541 of the user using the camera or the sensor. The end gesture 1541 may be determined according to performance of the electronic device 101 and may be determined by a setting of the user. For example, the electronic device 101 may receive the end gesture 1541 in a state where the first is clenched in the first gesture. When the end gesture 1541 is recognized, the electronic device 101 may end the process of receiving and converting the utterance input of the user into the text. In an embodiment, when receiving the end gesture 1541, the electronic device 101 may determine coordinates to place text and may fix the text in a position corresponding to the coordinates. In an embodiment, the electronic device 101 may determine the coordinates based on a change in position of the end gesture 1541 of the user or the like.

The electronic device 101 may display text 1542 to which the function is mapped and a type 1543 of the mapped function together on the coordinates.

In the fifth state 1505, the electronic device 101 may receive a user input 1551 selecting text 1552 to which the function is mapped. The electronic device 101 may execute a function 1553 mapped to the text 1552, in response to the user input 1551 selecting the text 1552 to which the function is mapped. For example, when receiving the user input 1551 for the text 1552 to which a search function 1553 is mapped, the electronic device 101 may execute a function of finding and informing weather in response to the user input 1551.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120 and/or 301) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a display;
a camera;
a memory; and
at least one processor operatively connected with the display, the camera, and the memory, wherein the at least one processor is configured to control the electronic device to:
receive a first gesture input via at least a part of a human body of a user via the camera;
display text corresponding to an utterance input which is received while the first gesture input is received, at coordinates corresponding to a position of at least a part of the human body of the user on augmented reality (AR) via the display;
when receiving an end gesture input via at least a part of the human body of the user via the camera, fix the displayed text in a specified position on the AR,
when a second gesture is input via at least a part of the human body of the user via the camera while the text is displayed, edit the displayed text depending on a function corresponding to the second gesture input, wherein the second gesture includes a plurality of gesture states and the function includes a plurality of visual adjustments for the displayed text, each of the plurality of visual adjustments corresponding to a different gesture of the plurality of gesture states; and
update the displayed text to display the edited text on the display.

2. The electronic device of claim 1, wherein the end gesture is a gesture having a similarity of a threshold or more with the first gesture.

3. The electronic device of claim 1, wherein the second gesture is a gesture having a similarity of a threshold or more with the first gesture.

4. The electronic device of claim 1, wherein the function corresponding to the second gesture input comprises adjusting at least one of a color, a size, a shape, or a slope of the generated text.

5. The electronic device of claim 1, wherein the function corresponding to the second gesture input comprises setting an open range of the generated text.

6. The electronic device of claim 1, wherein the function corresponding to the second gesture input comprises mapping to perform a predetermined operation, when the processor is configured to receive an input using the text fixed in the specified position on the AR.

7. The electronic device of claim 1, wherein the processor is configured to select one of a plurality of selectable options of the function corresponding to the second gesture input based on at least a number of times of inputting the second gesture input.

8. The electronic device of claim 3, wherein the processor is configured to select one of a plurality of selectable options based on at least a similarity between the second gesture and the first gesture.

9. The electronic device of claim 1, wherein the processor is configured to determine coordinates to place the displayed text on the AR based on at least a change in position of the end gesture input, when receiving the end gesture input, and fix the displayed text in a position corresponding to the determined coordinates.

10. The electronic device of claim 9, wherein the fix of the text comprises placement of the text such that the displayed text is displayed at a specified position on the AR.

11. A method performed by an electronic device, the method comprising:
receiving a first gesture input via a part of a human body of a user via a camera included in the electronic device;
displaying, via a display of the electronic device, text corresponding to an utterance input which is received while the first gesture input is received, at coordinates corresponding to a position of a part of the human body of the user on augmented reality (AR); and
providing the displayed text in a specified position on the AR, based on at least receiving an end gesture input via a part of the human body of the user via the camera, further comprising:
when a second gesture is input via at least a part of the human body of the user via the camera while the text is displayed, editing the displayed text depending on a function corresponding to the second gesture input, wherein the second gesture includes a plurality of gesture states and the function includes a plurality of visual adjustments for the displayed text, each of the plurality of visual adjustments corresponding to a different gesture of the plurality of gesture states; and
updating the displayed text to display the edited text on the display.

12. The method of claim 11, wherein the end gesture comprises a gesture having a similarity of a threshold or more with the first gesture.

13. The method of claim 11, wherein the second gesture comprises a gesture having a similarity of a threshold or more with the first gesture.

14. The method of claim 11, wherein the function corresponding to the second gesture input comprises adjusting at least one of a color, a size, a shape, or a slope of the generated text.

15. The method of claim 11, wherein the function corresponding to the second gesture input comprises setting an open range of the generated text.

16. The method of claim 11, wherein the function corresponding to the second gesture input comprises mapping to perform a predetermined operation, when the electronic device receives an input using the text fixed in the specified position on the AR.

17. The method of claim 11, further comprising:
selecting one of selectable options of the function corresponding to the second gesture input based on at least a number of times of inputting the second gesture input.

18. The method of claim 13, further comprising:
selecting one of selectable options using at least one of a number of the selectable options and a similarity between the second gesture and the first gesture.

19. The method of claim 11, further comprising:
determining coordinates to place the displayed text on the AR based on at least a change in position of the end gesture input, when receiving the end gesture input; and
fixing the displayed text in a position corresponding to a position of the determined coordinates.

20. The method of claim 11, wherein providing the text may be placing the text such that the displayed text is displayed at a specified position on the AR.

* * * * *